(12) United States Patent
Groombridge et al.

(10) Patent No.: US 11,799,077 B2
(45) Date of Patent: Oct. 24, 2023

(54) ACTIVE ELECTRODE MATERIAL

(71) Applicant: Echion Technologies Limited, Cambridge (GB)

(72) Inventors: Alexander Groombridge, Cambridge (GB); Wanwei Zhang, Cambridge (GB); Peter Slater, Birmingham (GB); Jianshen Wu, Cambridge (GB)

(73) Assignee: Echion Technologies Limited, Cambridge (GB)

( * ) Notice: Subject to any disclaimer, the term of this patent is extended or adjusted under 35 U.S.C. 154(b) by 0 days.

(21) Appl. No.: 18/008,011

(22) PCT Filed: Jun. 2, 2021

(86) PCT No.: PCT/GB2021/051357
§ 371 (c)(1),
(2) Date: Dec. 2, 2022

(87) PCT Pub. No.: WO2021/245410
PCT Pub. Date: Dec. 9, 2021

(65) Prior Publication Data
US 2023/0197942 A1    Jun. 22, 2023

(30) Foreign Application Priority Data

Jun. 3, 2020 (GB) .................................... 2008352
Jul. 28, 2020 (GB) .................................... 2011681
Aug. 28, 2020 (GB) .................................... 2013576

(51) Int. Cl.
*H01M 4/485* (2010.01)
*H01M 4/62* (2006.01)
(Continued)

(52) U.S. Cl.
CPC ........... *H01M 4/485* (2013.01); *H01M 4/625* (2013.01); *H01M 10/0525* (2013.01); *H01M 2004/021* (2013.01); *H01M 2004/027* (2013.01)

(58) Field of Classification Search
CPC .................................................... H01M 4/485
See application file for complete search history.

(56) References Cited

U.S. PATENT DOCUMENTS 4,542,083 A    9/1985    Cava et al.
6,124,057 A    9/2000    Ito et al.
(Continued)

FOREIGN PATENT DOCUMENTS

CN      102326282 A      1/2012
CN      106299329 A      1/2017
(Continued)

OTHER PUBLICATIONS

Li et.al; "Electrochemical Lithium Intercalation in Monoclinic Nb12O29"; 2011 (Year: 2011).*
(Continued)

*Primary Examiner* — Nathanael T Zemui
(74) *Attorney, Agent, or Firm* — Wolf, Greenfield & Sacks, P.C.

(57) ABSTRACT

The present invention provides a phosphorus niobium oxide active electrode material with the composition M1aPxaM2bNb9-bO25-c-dQd, wherein: M1 is selected from Na, K, Mg, Ca, Sr, Y, Ti, Zr, Hf, V, Nb, Ta, Cr, Mo, W, Mn, Fe, Co, Ni, Cu, Zn, B, Al, Ga, Si, Ge, Sn, Bi, Sb, and mixtures thereof; M2 is selected from Na, K, Mg, Ca, Sr, Y, Ti, Zr, Hf, V, Ta, Cr, Mo, W, Mn, Fe, Co, Ni, Cu, Zn, B, Al, Ga, Si, Ge, Sn, Bi, P, Sb, and mixtures thereof; Q is selected from F, Cl, Br, I, N, S, Se, and mixtures thereof; 0≤a≤0.5; 0≤b'2; −0.5≤c≤1.25; 0≤d≤5; 1≤x≤2; one or more of a, b, c, and d
(Continued)

does not equal 0; with the proviso that if M1 consists of Nb and if M2 consists of P then c is >0. Such materials are of interest as active electrode materials in lithium-ion or sodium-ion batteries.

20 Claims, 4 Drawing Sheets

(51) Int. Cl.
*H01M 10/0525* (2010.01)
*H01M 4/02* (2006.01)

(56) References Cited

U.S. PATENT DOCUMENTS

| | | | |
|---|---|---|---|
| 6,391,496 | B1 | 5/2002 | Nakajima et al. |
| 8,647,773 | B2 | 2/2014 | Goodenough et al. |
| 9,515,319 | B2 | 12/2016 | Harada et al. |
| 9,698,417 | B2 | 7/2017 | Buannic et al. |
| 9,806,339 | B2 | 10/2017 | Nakahara et al. |
| 10,263,243 | B2 | 4/2019 | Inoue et al. |
| 10,749,169 | B2 | 8/2020 | Harada et al. |
| 11,721,806 | B2 | 8/2023 | Groombridge et al. |
| 2012/0052401 | A1 | 3/2012 | Goodenough et al. |
| 2015/0010820 | A1 | 1/2015 | Takami et al. |
| 2015/0086872 | A1 | 3/2015 | Ise et al. |
| 2015/0270543 | A1 | 9/2015 | Harada et al. |
| 2016/0087275 | A1 | 3/2016 | Zhang et al. |
| 2016/0268602 | A1 | 9/2016 | Inagaki et al. |
| 2017/0040643 | A1 | 2/2017 | Dolle et al. |
| 2017/0077509 | A1 | 3/2017 | Ise et al. |
| 2018/0083283 | A1 | 3/2018 | Yamashita et al. |
| 2018/0219221 | A1 | 8/2018 | Yamauchi |
| 2018/0277835 | A1* | 9/2018 | Ise ............... H01M 10/052 |
| 2018/0277907 | A1 | 9/2018 | Iwasaki et al. |
| 2019/0044179 | A1 | 2/2019 | Sugimori et al. |
| 2019/0088941 | A1* | 3/2019 | Harada ............ H01M 10/0525 |
| 2019/0252131 | A1 | 8/2019 | Zhamu et al. |
| 2019/0280291 | A1 | 9/2019 | Pan et al. |
| 2019/0288283 | A1 | 9/2019 | Harada et al. |
| 2020/0091502 | A1 | 3/2020 | Harada et al. |
| 2020/0091513 | A1 | 3/2020 | Harada et al. |
| 2020/0112018 | A1 | 4/2020 | Zhang et al. |
| 2020/0140339 | A1 | 5/2020 | Ko et al. |
| 2020/0152963 | A1 | 5/2020 | Zhang et al. |
| 2020/0235384 | A1 | 7/2020 | Yoshioka et al. |
| 2022/0380226 | A1 | 12/2022 | Groombridge et al. |
| 2022/0384797 | A1 | 12/2022 | Groombridge et al. |
| 2022/0384798 | A1 | 12/2022 | Groombridge et al. |
| 2023/0178719 | A1 | 6/2023 | Groombridge et al. |
| 2023/0231123 | A1 | 7/2023 | Groombridge et al. |

FOREIGN PATENT DOCUMENTS

| | | |
|---|---|---|
| CN | 106532109 A | 3/2017 |
| CN | 107742716 A | 2/2018 |
| CN | 108807963 A | 11/2018 |
| CN | 109167049 A | 1/2019 |
| CN | 109244443 A | 1/2019 |
| CN | 109360978 A | 2/2019 |
| CN | 109904441 A | 6/2019 |
| CN | 110137481 A | 8/2019 |
| CN | 107742716 B | 4/2020 |
| DE | 69707637 T2 | 8/2002 |
| EP | 0 853 347 A1 | 7/1998 |
| EP | 2 361 888 A2 | 8/2011 |
| EP | 2 503 625 A3 | 7/2015 |
| EP | 2 975 679 A1 | 1/2016 |
| EP | 2 980 891 A1 | 2/2016 |
| EP | 3 070 767 A1 | 6/2016 |
| EP | 3 121 878 A1 | 1/2017 |
| EP | 3 220 454 B1 | 9/2019 |
| EP | 3 539 927 A1 | 9/2019 |
| GB | 2588254 A | 4/2021 |
| GB | 2588264 A | 4/2021 |
| GB | 2595745 A | 12/2021 |
| GB | 2598432 A | 3/2022 |
| GB | 2598438 A | 3/2022 |
| JP | H09-253495 A | 9/1997 |
| JP | H10-233208 A | 9/1998 |
| JP | H10-255796 A | 9/1998 |
| JP | 3390327 B2 | 3/2003 |
| JP | 3426901 B2 | 7/2003 |
| JP | 5694411 B2 | 4/2015 |
| JP | 6200533 B2 | 9/2017 |
| KR | 20150131800 A | 11/2015 |
| WO | WO 2015/138019 A1 | 9/2015 |
| WO | WO 2019/234248 A1 | 12/2019 |
| WO | WO 2019/243614 A1 | 12/2019 |
| WO | WO 2020/073915 A1 | 4/2020 |
| WO | WO 2020/098427 A1 | 5/2020 |
| WO | WO 2019/093404 A1 | 7/2020 |
| WO | WO 2021/074592 A1 | 4/2021 |
| WO | WO 2021/074593 A1 | 4/2021 |
| WO | WO 2021/074594 A1 | 4/2021 |
| WO | WO 2021074406 A1 | 4/2021 |
| WO | WO 2021/245410 A1 | 12/2021 |

OTHER PUBLICATIONS

Search Report under Section 17 for Application No. GB2011681.0 dated Sep. 8, 2020.
Bergner et al., VNb9O25—δ—Synthesis, electrical conducting behaviour and density functional theory (DFT) calculation. J Solid State Chem. Aug. 2009; 182(8):2053-60.
Morcrette et al., In situ X-ray diffraction techniques as a powerful tool to study battery electrode materials. Electrochim Acta. Jul. 27, 2002;47(19):3137-49.
Preefer et al., Multielectron Redox and Insulator-to-Metal Transition upon Lithium Insertion in the Fast-Charging, Wadsley-Roth Phase PNb9O25. Chem Mater. May 13, 2020;32(11):4553-63.
Yu et al., The journey of lithium ions in the lattice of PNb9O25. Mater Chem Front. Dec. 20, 2019;4(2):631-7.
Search Report under Section 17 for Application No. GB2002487.3 dated Apr. 10, 2020.
Further Search Report under Section 17 for Application No. GB2002487.3 dated May 13, 2020.
Search Report under Section 17 for Application No. GB2008352.3 dated Jul. 9, 2020.
Search Report under Section 17 for Application No. GB2013576.0 dated Oct. 20, 2020.
Search Report under Section 17 for Application No. GB2104508.3 dated Sep. 10, 2021.
Search Report under Section 17 for Application No. GB2104713.9 dated May 26, 2021.
Search Report under Section 17 for Application No. GB2105082.8 dated Jun. 1, 2021.
Search Report under Section 17 for Application No. GB2105091.9 dated May 27, 2021.
International Search Report for International Application No. PCT/GB2020/052485 dated Mar. 12, 2021.
International Search Report for International Application No. PCT/GB2020/052486 dated Jan. 18, 2021.
International Search Report for International Application No. PCT/GB2020/052487 dated Mar. 12, 2021.
International Search Report and Written Opinion for International Application No. PCT/GB2021/051357 dated Aug. 9, 2021.
International Search Report and Written Opinion for International Application No. PCT/GB2021/051358 dated Aug. 9, 2021.
International Search Report for International Application No. PCT/GB2021/052228 dated Nov. 17, 2021.
Benabbas et al., Redetermination of the structure of PNb9O25. Acta Cryst. Apr. 1991;47(4):849-50.
Bini et al., The Doping of FeNb11O29 as a Way to Improve Its Electrochemical Performances. ChemistrySelect. May 21, 2019;4(19):5656-61.
Cava et al., Lithium Insertion in Wadsley-Roth Phases Based on Niobium Oxide. J Electrochem Soc. Jan. 1, 1983;130(12):2345-51.

(56) References Cited

OTHER PUBLICATIONS

Cava et al., Lithium insertion, electrical conductivity, and chemical substitution in various crystallographic shear structures. Solid State Ionics. Dec. 1983;9-10(Part 1):407-11.
Fu et al., Design, synthesis and lithium-ion storage capability of Al0.5Nb24.5O62. J Mater Chem A. Aug. 13, 2019;7(34):19862-71.
Fu et al., Highly conductive CrNb11O29 nanorods for use in high-energy, safe, fast-charging and stable lithium-ion batteries. J Power Sources. Sep. 1, 2018;397:231-9.
Glaum et al., Resource-Efficient Alkane Selective Oxidation on New Crystalline Solids: Searching for Novel Catalyst Materials. Special Issue: Innovative Technologien fur Ressourceneffizienz. Oct. 2012;84(10):1766-79.
Goodenough et al., The Li-ion rechargeable battery: a perspective. J Am Chem Soc. Jan. 30, 2013;135(4):1167-76. doi: 10.1021/ja3091438. Epub Jan. 18, 2013.
Griffith et al., High-Rate Intercalation without Nanostructuring in Metastable Nb2O5 Bronze Phases. J Am Chem Soc. Jul. 20, 2016;138(28):8888-99. doi: 10.1021/jacs.6b04345. Epub Jul. 10, 2016.
Griffith et al., Niobium tungsten oxides for high-rate lithium-ion energy storage. Nature. Jul. 2018;559(7715):556-563. doi: 10.1038/s41586-018-0347-0. Epub Jul. 25, 2018.
Griffith et al., Structural Stability from Crystallographic Shear in TiO2—Nb2O5 Phases: Cation Ordering and Lithiation Behavior of TiNb24O62. Inorg Chem. Mar. 20, 2017;56(7):4002-10.
Griffith et al., Titanium Niobium Oxide: From Discovery to Application in Fast-Charging Lithium-Ion Batteries. Chem Mater. Dec. 17, 2020;33(1):4-18.
Jayaprakash et al., A new class of tailor-made Fe0.92Mn0.08Si2 lithium battery anodes: Effect of composite and carbon coated Fe0.92Mn0.08Si2 anodes. Intermetallics. Mar. 2007:15(3):442-50.
Koçer et al., Cation Disorder and Lithium Insertion Mechanism of Wadsley-Roth Crystallographic Shear Phases from First Principles. J Am Chem Soc. Sep. 25, 2019;141(38):15121-15134. doi: 10.1021/jacs.9b06316. Epub Sep. 12, 2019.
Li et al., High-performance fuel electrodes based on NbTi0.5M0.5O4 (M = Ni, Cu) with reversible exsolution of the nano-catalyst for steam electrolysis. J Mater Chem A. May 2013; 1(31):8984-93.
Li et al., Novel GaNb49O124 microspheres with intercalation pseudocapacitance for ultrastable lithium-ion storage. Ceramics International. Jun. 15, 2019;45(9):12211-7.
Lou et al., Exploration of Cr0.2Fe0.8Nb11O29 as an advanced anode material for lithium-ion batteries of electric vehicles. Electrochim Acta. Aug. 10, 2017;245:482-8.
Lou et al., GaNb11O29 Nanowebs as High-Performance Anode Materials for Lithium-Ion Batteries. ACS Appl Nano Mater. Dec. 21, 2017;1(1):183-90.
Lou et al., New Anode Material for Lithium-Ion Batteries: Aluminum Niobate (ALNb11O29). ACS Appl Mater Interfaces. Feb. 13, 2019;11(6):6089-6096. doi: 10.1021/acsami.8b20246. Epub Feb. 4, 2019. Supporting Information.
Montemayor et al., Lithium insertion in two tetragonal tungsten bronze type phases, M8W9047 (M=Nb and Ta). J Mater Chem. 1998;8(12):2777-81.
Patoux et al., A Reversible Lithium Intercalation Process in an ReO3 Type Structure PNb9 O 25. J Electrochem Soc. Feb. 19, 2002;149(4):A391-400.
Qian et al., High-Rate Long-Life Pored Nanoribbon VNb9O25 Built by Interconnected Ultrafine Nanoparticles as Anode for Lithium-Ion Batteries. ACS Appl Mater Interfaces. Sep. 13, 2017;9(36):30608-30616. doi: 10.1021/acsami.7b07460. Epub Sep. 1, 2017.
Roth et al., The crystal structure of PNbO25 (P2O5.9Nb2O5). Acta Cryst. Apr. 1965; 18(4):643-7.
Saritha et al., Electrochemical Li insertion studies on WNb12O33—A shear ReO3 type structure. J Solid State Chem. May 2010; 183(5):988-93.
Saritha, Electrochemical analysis of tungsten bronze-type phases, W9Nb8O47 and W7Nb4O31, synthesised by sol-gel method. Mater Sci Eng B. Feb. 2018;228:218-23.

Shannon, Revised effective ionic radii and systematic studies of interatomic distances in halides and chalcogenides. Acta Cryst. 1976;A32:751-67.
Solis et al., Adjusting the conduction properties of La0.995Ca0.005NbO4—δ by doping for proton conducting fuel cells electrode operation. Solid State Ionics. May 19, 2011;190(1):38-45.
Song et al., A Mo-doped TiNb2O7 anode for lithium-ion batteries with high rate capability due to charge redistribution. Chem Commun (Camb). Jun. 18, 2015;51(48):9849-52. doi: 10.1039/c5cc02221e. Author manuscript provided. 5 pages.
Spada et al., Deepening the shear structure FeNb11O29: influence of polymorphism and doping on structural, spectroscopic and magnetic properties. Dalton Trans. Nov. 13, 2018;47(44):15816-15826. doi: 10.1039/c8dt02896f.
Stephenson, A structural investigation of some stable phases in the region Nb2O5.WO3-WO3. Acta Cryst Section B. Jan. 1, 1968;B24:637-53.
Tabero, Thermal expansion of phases formed in the system Nb2O5-MoO3. J Therm Anal Calorim. Nov. 2003;74(2):491-6.
Takashima et al., Characterization of mixed titanium-niobium oxide Ti2Nb10O29 annealed in vacuum as anode material for lithium-ion battery. J Power Sources. Feb. 15, 2015;276:113-9.
Tomaszewska et al., Lithium-ion battery fast charging: A review. eTransportation. Aug. 2019;1:100011.
Wu et al., Rational synthesis of Cr0.5Nb24.5O62 microspheres as high-rate electrodes for lithium ion batteries. J Colloid Interface Sci. Mar. 7, 2020;562:511-517. doi: 10.1016/j.jcis.2019.11.085. Epub Nov. 21, 2019.
Xiao et al., The positive effect of nitridation on CrNb49O124 nanowires for high-performance lithium-ion storage. Ceramics International. Jul. 2020;46(10):15527-33.
Xu et al., Synthesis, structure, and physical properties of niobium phosphate bronze (Nb18P2.5O50). Inorg Chem. Jan. 1, 1994;33(2):267-70.
Yan et al., Electrospun WNb12O33 nanowires: superior lithium storage capability and their working mechanism. J Mater Chem A. Apr. 10, 2017;5(19):8972-80.
Yang et al., Cr0.5Nb24.5O62 Nanowires with High Electronic Conductivity for High-Rate and Long-Life Lithium-Ion Storage. ACS Nano. Apr. 25, 2017;11(4):4217-4224. doi: 10.1021/acsnano.7b01163. Epub Apr. 3, 2017.
Yang et al., Porous ZrNb24O62 nanowires with pseudocapacitive behavior achieve high-performance lithium-ion storage. J Mater Chem A. Sep. 25, 2017;5(42):22297-304.
Yang et al., Wadsley-Roth Crystallographic Shear Structure Niobium-Based Oxides: Promising Anode Materials for High-Safety Lithium-Ion Batteries. Adv Sci (Weinh). Jun. 2021;8(12):e2004855. doi: 10.1002/advs.202004855. Epub Mar. 1, 20215.
Ye et al., Constructing Hollow Nanofibers To Boost Electrochemical Performance: Insight into Kinetics and the Li Storage Mechanism for CrNb49O124. ACS Appl Energy Mater. Mar. 12, 2019;2(4):2672-9.
Ye et al., Highly efficient lithium container based on non-Wadsley-Roth structure Nb18W16O93 nanowires for electrochemical energy storage. Electrochim Acta. Dec. 1, 2018;292:331-8. Author manuscript provided. 39 pages.
Yu et al., PNb9O25 nanofiber as a high-voltage anode material for advanced lithium ions batteries. J Materiomics. Dec. 2020;6(4):781-7. Journal Pre-proof.
Yuan et al., Recent Advances in Titanium Niobium Oxide Anodes for High-Power Lithium-Ion Batteries. Energy Fuels. Sep. 21, 2020;34(11):13321-34. Author manuscript provided. 50 pages.
Zhai et al., Oxygen vacancy boosted the electrochemistry performance of Ti4+ doped Nb2O5 toward lithium ion battery. Appl Surf Sci. Jan. 1, 2020;499:143905.
Zheng et al., Rational construction and decoration of Fe0.5Nb24.5O62-x@C nanowires as superior anode material for lithium storage. Chem Eng J. Mar. 15, 2020;384:123314.
Zhou et al., Facile spray drying route for the Three-Dimensional Graphene-encapsulated Fe2O3 Nanoparticles for Lithium Ion Battery Anodes. Ind Eng Chem Res. 2013;52:1197-204.

(56) References Cited

OTHER PUBLICATIONS

Zhu et al., An inverse opal Cu2Nb3O87 anode for high-performance Li+ storage. Chem Commun (Camb). Jul. 7, 2020;56(53):7321-7324. doi: 10.1039/d0cc02016h. Epub Jun. 1, 2020. Author manuscript provided. 5 pages.

Zhu et al., Mg2Nb34O87 Porous Microspheres for Use in High-Energy, Safe, Fast-Charging, and Stable Lithium-Ion Batteries. ACS Appl Mater Interfaces. Jul. 18, 2018;10(28):23711-23720. doi: 10.1021/acsami.8b03997. Epub Jul. 5, 2018.

Zhu et al., MoNb12O33 as a new anode material for high-capacity, safe, rapid and durable Li+ storage: structural characteristics, electrochemical properties and working mechanisms. J Mater Chem A. Mar. 2019;7(11):6522-32.

Zhu et al., Zinc niobate materials: crystal structures, energy-storage capabilities and working mechanisms. J Mater Chem A. Oct. 31, 2019;7(44):25537-47.

Examination Report under Section 18(3) for GB Application No. GB2105082.8 dated Aug. 5, 2021.

Lou et al., Crystal Structure Modification Enhanced FeNb11O29 Anodes for Lithium-Ion Batteries. ChemElectroChem. Dec. 2017;4(12):3171-80.

Amonpattarakit et al., X-Ray Diffraction and Zn K-Edge XANES Studies of Perovskite Ferroelectric PZT-PZN Powders Derived from Zn2Nb34O87 Precursor. Ferroelectrics. Feb. 17, 2016;492:25-34.

Drozhzhin et al., Li-ion diffusion in LixNb9PO25. Electrochim Acta. Feb. 1, 2013;89:262-9.

Ji et al., Carbon-emcoating architecture boosts lithium storage of Nb2O5. Science China Materials. Dec. 24, 2020;64(5):1071-86.

Lou et al., Nb-Based Oxides as Anode Materials for Lithium Ion Batteries. Progress in Chemistry. Mar. 2015;27(2/3):297-309.

Lu et al., Investigation of Physical and Electrochemical Properties of β-TaxNb1-xPO5 as an Electrode Material for Lithium Batteries. Chem Mater. Apr. 15, 2016;28(9):2949-61.

Yang et al., Conductive Copper Niobate: Superior Li+-Storage Capability and Novel Li+-Transport Mechanism. Adv Energ Mater. Oct. 17, 2019;9(39):1902174.

U.S. Appl. No. 17/769,716, filed Apr. 15, 2022, Groombridge et al.
U.S. Appl. No. 17/769,717, filed Apr. 15, 2022, Groombridge et al.
U.S. Appl. No. 17/775,239, filed May 6, 2022, Groombridge et al.
U.S. Appl. No. 18/007,912, filed Dec. 2, 2022, Groombridge et al.
GB2002487.3, Apr. 10, 2020, Search Report.
G82002487.3, May 13, 2020, Further Search Report.
GB2008352.3, Jul. 9, 2020, Search Report.
GB2013576.0, Oct. 20, 2020, Search Report.
GB2104508.3, Sep. 10, 2021, Search Report.
GB2104713.9, May 26, 2021, Search Report.
GB2105082.8, Jun. 1, 2021, Search Report.
GB2105091.9, May 27, 2021, Search Report.
PCT/GB2020/052485, Mar. 12, 2021, International Search Report.
PCT/GB2020/052486, Jan. 18, 2021, International Search Report.
PCT/GB2020/052487, Mar. 12, 2021, International Search Report.
PCT/GB2021/051357, Aug. 9, 2021, International Search Report and Written Opinion.
PCT/GB2021/051358, Aug. 9, 2021, International Search Report and Written Opinion.
PCT/GB2021/052228, Nov. 17, 2021, International Search Report.
U.S. Appl. No. 18/335,675, filed Jun. 15, 2023, Groombridge et al.
U.S. Appl. No. 18/021,657, filed Feb. 16, 2023, Groombridge et al.
U.S. Appl. No. 18/021,661, filed Feb. 16, 2023, Groombridge et al.
U.S. Appl. No. 18/021,703, filed Feb. 16, 2023, Groombridge et al.
G82105082.8, Aug. 5, 2021, Examination Report under Section 18(3).

\* cited by examiner

ACTIVE ELECTRODE MATERIAL

RELATED APPLICATIONS

This Application is a national stage filing under 35 U.S.C. § 371 of International Patent Application Serial No. PCT/GB2021/051357, filed Jun. 2, 2021, entitled "ACTIVE ELECTRODE MATERIAL," which claims priority to GB Application Number 2008352.3, filed Jun. 3, 2020; GB Application Number 2011681.0, filed Jul. 28, 2020; and GB Application Number 2013576.0, filed Aug. 28, 2020, each of which is hereby incorporated herein by reference in their entireties.

FIELD OF THE INVENTION

The present invention relates to active electrode materials and to methods for the manufacture of active electrode materials. Such materials are of interest as active electrode materials in lithium-ion or sodium-ion batteries, for example as anode materials for lithium-ion batteries.

BACKGROUND

Lithium-ion (Li-ion) batteries are a commonly used type of rechargeable battery with a global market predicted to grow to $200bn by 2030. Li-ion batteries are the technology of choice for electric vehicles that have multiple demands across technical performance to environmental impact, providing a viable pathway for a green automotive industry.

A typical lithium-ion battery is composed of multiple cells connected in series or in parallel. Each individual cell is usually composed of an anode (negative polarity electrode) and a cathode (positive polarity electrode), separated by a porous, electrically insulating membrane (called a separator), immersed into a liquid (called an electrolyte) enabling lithium ions transport.

In most systems, the electrodes are composed of an electrochemically active material—meaning that it is able to chemically react with lithium ions to store and release them reversibly in a controlled manner—mixed if necessary with an electrically conductive additive (such as carbon) and a polymeric binder. A slurry of these components is coated as a thin film on a current collector (typically a thin foil of copper or aluminium), thus forming the electrode upon drying.[1]

In the known Li-ion battery technology, the safety limitations of graphite anodes upon battery charging is a serious impediment to its application in high-power electronics, automotive and industry. Among a wide range of potential alternatives proposed recently, lithium titanate (LTO) and mixed niobium oxides are the main contenders to replace graphite as the active material of choice for high power, fast-charge applications.

Batteries relying on a graphitic anode are fundamentally limited in terms of charging rate. Under nominal conditions, lithium ions are inserted into the anode active material upon charging. When charging rate increases, typical graphite voltage profiles are such that there is a high risk that overpotentials lead to the potential of sites on the anode to become <0 V vs. Li/Li+, which leads to a phenomenon called lithium dendrite electroplating, whereby lithium ions instead deposit at the surface of the graphite electrode as lithium metal. This leads to irreversible loss of active lithium and hence rapid capacity fade of the cell. In some cases, these dendritic deposits can grow to such large sizes that they pierce the battery separator and lead to a short-circuit of the cell. This can trigger a catastrophic failure of the cell leading to a fire or an explosion. Accordingly, the fastest-charging batteries having graphitic anodes are limited to charging rates of 5-7 C, but often much less.

Lithium titanate (LTO) anodes do not suffer from dendrite electroplating at high charging rate thanks to their high potential (1.6 V vs. Li/Li+), and have excellent cycle life as they do not suffer from significant volume expansion of the active material upon intercalation of Li ions due to their accommodating 3D crystal structure. LTO cells are typically regarded as high safety cells for these two reasons. However, LTO is a relatively poor electronic and ionic conductor, which leads to limited capacity retention at high rate and resultant power performance, unless the material is nano-sized to increase specific surface area, and carbon-coated to increase electronic conductivity. This particle-level material engineering increases the porosity and specific surface area of the active material, and results in a significantly lower achievable packing density in an electrode. This is significant because it leads to low density electrodes and a higher fraction of electrochemically inactive material (e.g. binder, carbon additive), resulting in much lower gravimetric and volumetric energy densities.

A key measure of anode performance is the electrode volumetric capacity (mAh/cm$^3$), that is, the amount of electric charges (that is lithium ions) that can be stored per unit volume of the anode. This is an important factor to determine the overall battery energy density on a volumetric basis (Wh/L) when combined with the cathode and appropriate cell design parameters. Electrode volumetric capacity can be approximated as the product of electrode density (g/cm$^3$), active material specific capacity (mAh/g), and fraction of active material in the electrode. LTO anodes typically have relatively low specific capacities (c. 165 mAh/g, to be compared with c. 330 mAh/g for graphite) which, combined with their low electrode densities (typically <2.0 g/cm$^3$) and low active material fractions (<90%) discussed above, lead to very low volumetric capacities (<300 mAh/cm$^3$) and therefore low battery energy density and high $/kWh cost in various applications. As a result, LTO batteries/cells are generally limited to specific niche applications, despite their long cycle life, fast-charging capability, and high safety.

Mixed niobium oxide structures based on phosphorus niobium oxides have been of recent interest for use in Li-ion cells. The crystal structure of $PN_9O_{25}$ was first reported by Roth et al in 1965,[2] consisting of a Wadsley-Roth ReO$_3$ shear structure with corner shared NbO$_6$ octahedra connected into blocks in a 3×3×∞ arrangement. The blocks are connected to adjacent blocks by edge sharing and corner-shared PO$_4$ tetrahedra. A similar structure with a slight distortion due to excess P was reported in 1994 by Xu et al $(P_{2.5}Nb_{18}O_{50})$.[3] Electrochemical insertion and use in Li ion cells was first reported by Patoux et al in 2002, and more recently by others in 2020.[4,5,6] This material has a higher theoretical and practical capacity (>200 mAh/g), low nominal voltage (<1.6 V vs Li/LI), and 3 orders of magnitude higher Li ion diffusion coefficient ($10^{-9}$-$10^{-12}$ cm$^2$s$^{-1}$) than LTO. Due to the much higher Li-ion diffusion coefficients, these materials no longer have to be highly nanostructured and engineered, as is necessary for use of LTO cells at high charge and discharge current. This also means commercial electrodes can be readily manufactured, with low quantities of additives and binders, reaching high electrode densities. This allows for higher volumetric energy densities and reduced $/kWh cell cost.

However, due to the nature of PNb$_9$O$_{25}$ as a composite oxide material, it is not electronically conductive enough to allow for efficient charging and discharging in Li-ion cells for commercial use, resulting in excess impedance. In addition, improvements can still be made in Li ion capacity, cycling efficiency (cf. cycle life), and in tuning the voltage profile of charge and discharge. Making these improvements as described herein without the need for extensive nanoscale or particle-level engineering, and without coatings, is an important step to low-cost battery materials for mass market uptakes. If these improvements are not addressed, then there is excess electrical resistance in a resultant device and lower energy densities, leading to increased polarisation, reduced power densities, lower energy efficiencies, and increased cost. Accordingly, there remains a need to further improve the properties of PNb$_9$O$_{25}$ and closely related structures for use in lithium-ion batteries.

SUMMARY OF THE INVENTION

In a first aspect, the invention provides a phosphorus niobium oxide active electrode material with the composition M1$_a$P$_{x-a}$M2$_b$Nb$_{9-b}$O$_{25-c-d}$Q$_d$, wherein:

M1 is selected from Na, K, Mg, Ca, Sr, Y, Ti, Zr, Hf, V, Nb, Ta, Cr, Mo, W, Mn, Fe, Co, Ni, Cu, Zn, B, Al, Ga, Si, Ge, Sn, Bi, Sb, and mixtures thereof;

M2 is selected from Na, K, Mg, Ca, Sr, Y, Ti, Zr, Hf, V, Ta, Cr, Mo, W, Mn, Fe, Co, Ni, Cu, Zn, B, Al, Ga, Si, Ge, Sn, Bi, P, Sb, and mixtures thereof;

Q is selected from F, Cl, Br, I, N, S, Se, and mixtures thereof;

0≤a≤0.5; 0≤b≤2; −0.5≤c≤1.25; 0≤d≤5; 1≤x≤2;

one or more of a, b, c, and d does not equal 0;

with the proviso that if M1 consists of Nb and if M2 consists of P then c is >0.

It will be understood that the composition of the active electrode material does not correspond to stoichiometric PNb$_9$O$_{25}$. The present inventors have found that by modifying materials including PNb$_9$O$_{25}$ by either incorporating further cations (M1 and/or M2) to form mixed cation active electrode materials, and/or by creating an induced oxygen deficiency or excess, and/or by forming mixed anion active electrode materials (comprising O and Q) the resulting material has improved electrochemical properties, and in particular improved electrochemical properties when used as an anode material. For instance, the inventors have found that materials according to the invention have a significantly improved capacity retention at high C-rates compared to PNb$_9$O$_{25}$, as shown by the present examples. This is an important result in demonstrating the advantages of the material of the invention for use in batteries designed for fast charge/discharge.

The active electrode materials of the invention are particularly useful in electrodes, preferably for use in anodes for lithium-ion or sodium-ion batteries. Therefore, a further implementation of the invention is a composition comprising the active electrode material of the first aspect and at least one other component; optionally wherein the at least one other component is selected from a binder, a solvent, a conductive additive, an additional active electrode material, and mixtures thereof. Such a composition is useful for fabricating an electrode. A further implementation of the invention is an electrode comprising the active electrode material of the first aspect in electrical contact with a current collector. A further implementation of the invention is an electrochemical device comprising an anode, a cathode, and an electrolyte disposed between the anode and the cathode, wherein the anode comprises an active electrode material according to the first aspect; optionally wherein the electrochemical device is a lithium-ion battery or a sodium-ion battery.

In a second aspect, the invention provides a method of making an active electrode material as defined by the first aspect, the method comprising steps of: providing one or more precursor materials; mixing said precursor materials to form a precursor material mixture; and heat treating the precursor material mixture in a temperature range from 400° C.-1350° C. or 800-1350° C., thereby providing the active electrode material. This represents a convenient and efficient method of making the active electrode material of the first aspect.

The invention includes the combination of the aspects and features described herein except where such a combination is clearly impermissible or expressly avoided.

SUMMARY OF THE FIGURES

The principles of the invention will now be discussed with reference to the accompanying figures in which.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

The term "mixed niobium oxide" (MNO) refers to an oxide comprising niobium and at least one other cation. MNO materials have a high redox voltage vs. Lithium >0.8V, enabling safe and long lifetime operation, crucial for fast charging battery cells. Moreover, niobium cations can have two redox reactions per atom, resulting in higher theoretical capacities than, for example, LTO. The material described herein is derived from the base structure of Pnb$_9$O$_{25}$ (also the isostructural P$_{2.5}$Nb$_{18}$O$_{50}$, and other isostructures where P$_x$Nb$_{18}$O$_{50}$, and 2≤x≤4),[3] which are phosphorus niobium oxide (PNO) materials.

Pnb$_9$O$_{25}$ may be considered to have a ReO$_3$-derived MO$_{3-x}$ crystal structure. Preferably, the PNO has a Wadsley-Roth crystal structure or a Phosphate Bronze crystal structure. Wadsley-Roth crystal structures are considered to be a crystallographic off-stoichiometry of the MO$_3$ (ReO$_3$) crystal structure containing crystallographic shear, with simplified formula of MO$_{3-x}$. As a result, these structures typically contain [MO$_6$] octahedral subunits in their crystal structure alongside others. The PNO materials with these structures are believed to have advantageous properties for use as active electrode materials, e.g. in lithium-ion batteries.

The open tunnel-like $MO_3$ crystal structure of PNO materials also makes them ideal candidates for having high capacity for Li ion storage and high rate intercalation/de-intercalation. The crystallographic off-stoichiometry present in the PNO structure causes the Wadsley-Roth crystallographic superstructure. These superstructures, compounded by other qualities such as the Jahn-Teller effect and enhanced crystallographic disorder by making use of multiple mixed cations, stabilise the crystal and keep the tunnels open and stable during intercalation, enabling extremely high rate performance due to high Li-ion diffusion rates (reported as $10^{-9}$-$10^{-10}$ cm$^2$ s$^{-1}$)[5]

Figure 3:
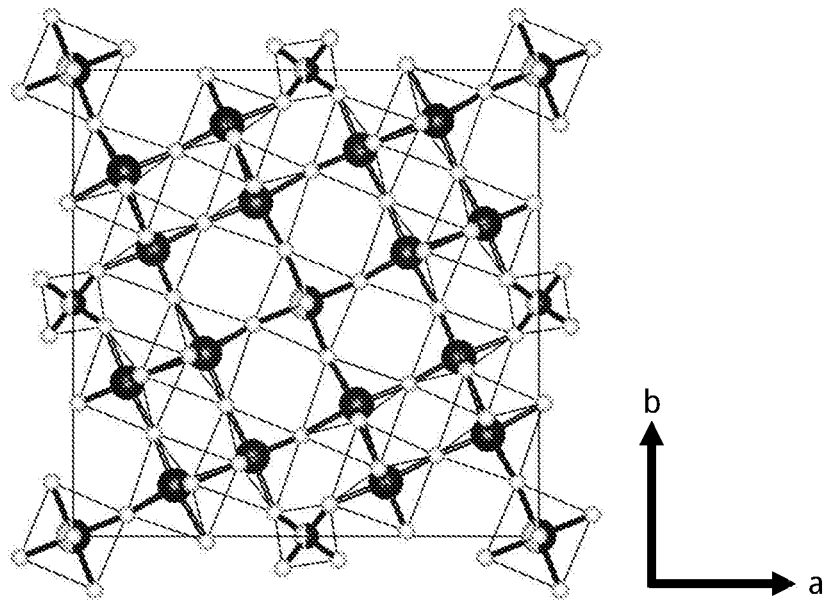
FIG. 3: A visualisation of the reference PNb$_9$O$_{25}$ unit cell.
Figure 4:
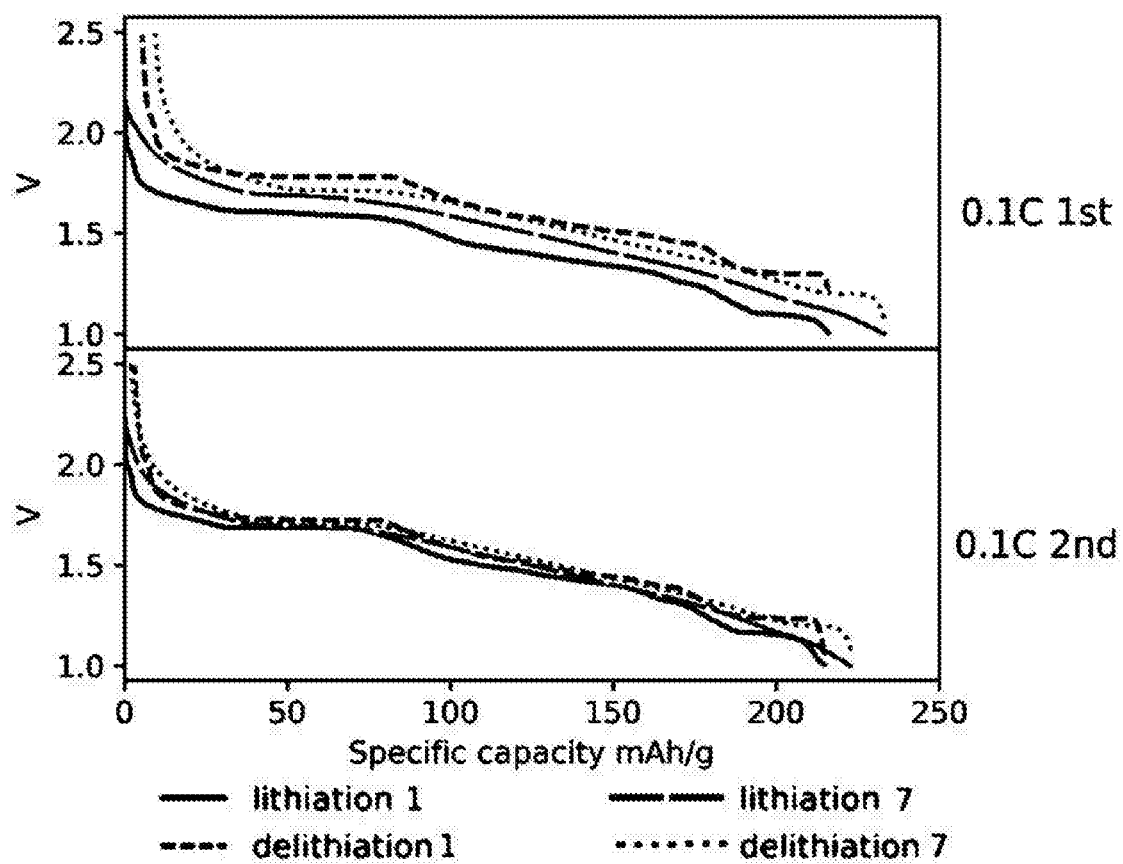
FIG. 4: Galvanostatic lithiation/delithiation curves for Sample 1 and 7 at a rate of C/10 for their first lithiation and de-lithiation cycles, between 1.0-3.0 V.
Figure 5:
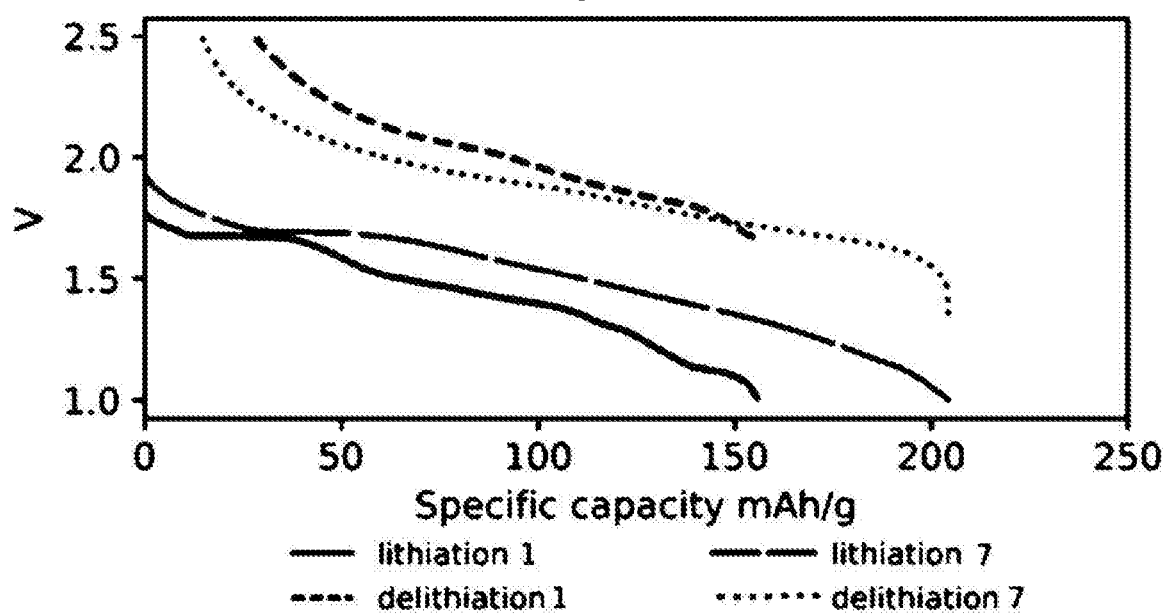
FIG. 5: Galvanostatic delithiation curves for Sample 1 and 7 at a rate of 10C, between 1.0-3.0 V. Lithiation curve shown at C/5.

The crystal formulae of $PNb_9O_{25}$ can be described as having a 3×3×∞ crystallographic block structure, with corner-sharing tetrahedra, as shown in FIG. 3. The crystal formulae of $P_{2.5}Nb_{18}O_{50}$ can be described as an isostructural phase to $PNb_9O_{25}$ with slight differences in some bond lengths due to additional P (P-O and Nb3-O2, Nb2-O2 for example). This has previously been reported as a Phosphate Bronze material,[3] but it and related theorised structures (i.e. $P_{2-4}Nb_{18}O_{50}$) are considered as a distorted Wadsley-Roth crystal structure herein.

The total crystal composition of the materials described herein are preferably charge neutral and thermodynamically favourable to follow the above description. Structures deficient in their oxygen content through introduction of oxygen vacancy defects are preferable when reducing the material's electrical resistance such that $M_xO_y$ becomes $M_xO_{y-\delta}$. Structures that have had cations (i.e. P and Nb) or anions (i.e. O) substituted may have been so with matching valency (i.e. a 5+ cation for equal proportions of a 4+ and 6+ cation) or with unmatched valency, which can induce oxygen deficiency or excess if substitution takes place at equivalent crystal sites (e.g. $Al_{0.05}P_{0.95}Nb_9O_{24.95}$ for deficiency, or $Mo_{0.05}P_{0.95}Nb_9O_{25.025}$ for excess). Substitution may also take place at different crystal sites, such as interstitial sites.

The crystal structure of a material may be determined by analysis of X-ray diffraction (XRD) patterns, as is widely known. For instance, XRD patterns obtained from a given material can be compared to known XRD patterns to confirm the crystal structure, e.g. via public databases such as the ICDD crystallography database. Rietveld analysis can also be used to determine the crystal structure of materials, in particular for the unit cell parameters. Therefore, the active electrode material may have a Wadsley-Roth or Phosphorus Bronze crystal structure, as determined by X-ray diffraction, preferably a Wadsley-Roth crystal structure.

Preferably, the crystal structure of the active electrode material, as determined by X-ray diffraction, corresponds to the crystal structure of one or more of $PNb_9O_{25}$, $VNb_9O_{25}$, or $P_{2.5}Nb_{18}O_{50}$; or one or more of $PNb_9O_{25}$ or $P_{2.5}Nb_{18}O_{50}$; or most preferably $PNb_9O_{25}$. The crystal structure of $PNb_9O_{25}$ may be found at ICDD crystallography database entry JCPDS 81-1304. The crystal structure of $VNb_9O_{25}$ may be found at JCPDS 49-0289. The crystal structure of $P_{2.5}Nb_{18}O_{50}$ may be found at ICDD 01-082-0081. The active electrode material may have unit cell parameters a, b, and c wherein a is 15.4-15.8 Å preferably 15.5-15.7 Å, b is 15.4-15.8 Å preferably 15.5-15.7 Å, and c=3.6-4.0 Å preferably 3.7-3.9 Å. Most preferably a=b. The active electrode material have unit cell parameters α, β, and γ each being about 90°, preferably wherein α=β=γ=90°. Unit cell parameters may be determined by X-ray diffraction. The active electrode material may have a crystallite size of 10-100 nm, preferably 30-60 nm, determined according to the Scherrer equation.

Here the term 'corresponds' is intended to reflect that peaks in an X-ray diffraction pattern may be shifted by no more than 0.5 degrees (preferably shifted by no more than 0.25 degrees, more preferably shifted by no more than 0.1 degrees) from corresponding peaks in an X-ray diffraction pattern of the material listed above.

The phosphorus niobium oxide has the composition $M1_aP_{x-a}M2_bNb_{9-b}O_{25-c-d}Q_d$, wherein:

M1 is selected from Na, K, Mg, Ca, Sr, Y, Ti, Zr, Hf, V, Nb, Ta, Cr, Mo, W, Mn, Fe, Co, Ni, Cu, Zn, B, Al, Ga, Si, Ge, Sn, Bi, Sb, and mixtures thereof;

M2 is selected from Na, K, Mg, Ca, Sr, Y, Ti, Zr, Hf, V, Ta, Cr, Mo, W, Mn, Fe, Co, Ni, Cu, Zn, B, Al, Ga, Si, Ge, Sn, Bi, P, Sb, and mixtures thereof;

Q is selected from F, Cl, Br, I, N, S, Se, and mixtures thereof;

$0 \leq a \leq 0.5$; $0 \leq b \leq 2$; $-0.5 \leq c \leq 1.25$; $0 \leq d \leq 5$; $1 \leq x \leq 2$;

one or more of a, b, c, and d does not equal 0;

with the proviso that if M1 consists of Nb and if M2 consists of P then c is >0.

By 'and mixtures thereof', it is intended that M1, M2, or Q may each represent two or more elements from their respective lists. An example of such a material is $Ti_{0.05}Mo_{0.05}P_{0.90}Nb_9O_{25}$. Here, M1 represents $Ti_{a'}Mo_{a''}$ (where a'+a"=a), a=0.1, b=0, c=0, and d=0. Another example of such a material is $Al_{0.05}P_{0.95}Ti_{0.225}Mo_{0.225}Nb_{8.55}O_{24.95}$. Here, M1 represents $Al_a$, M2 represents $Ti_{b'}Mo_{b''}$ (where b'+b"=b), a=0.05, b=0.45, c=0.05, and d=0.

The precise values of a, b, c, d within the ranges defined may be selected to provide a charge balanced, or substantially charge balanced, crystal structure. Additionally or alternatively, the precise values of a, b, c, d within the ranges defined may be selected to provide a thermodynamically stable, or thermodynamically metastable, crystal structure.

When exchange of the cations or anions in the structure (i.e. P, Nb, O) have taken place without preserving the initial valency, this can give rise to both oxygen deficiency and excess. For example, a material that substitutes $P^{5+}$ for $Mo^{6+}$ to some extent will demonstrate minor oxygen excess (i.e. $P_2O_5$ vs $MoO_3$), whereas substitution of $P^{5+}$ for $Al^{3+}$ will show a minor oxygen deficiency (i.e. $P_2O_5$ vs $Al_2O_3$). Oxygen deficiency can also be induced through thermal treatment in inert or reducing conditions, which results in induced oxygen vacancy defects in the structure.

M1 is a cation which substitutes for P in the crystal structure. M1 may be selected from Ti, Zr, Hf, V, Nb, Ta, Cr, Mo, W, Mn, Fe, Co, Ni, Cu, Zn, B, Al, Ga, Si, Ge, Sn, Bi, Sb, and mixtures thereof; or Ti, Zr, Hf, Cr, Mo, W, B, Al, Ga, Bi, Sb, and mixtures thereof; or Ti, Mo, Al, B, and mixtures thereof. Preferably M1 is not Nb. Preferably, M1 is not Na. M1 may have a different valency than $P^{5+}$. This gives rise to oxygen deficiency or excess. Preferably, M1 has a lower valency than $P^{5+}$. This gives rise to oxygen deficiency, i.e. the presence of oxygen vacancies providing the advantages discussed herein. M1 preferably has a different ionic radius than $P^{5+}$, most preferably a larger ionic radius. This gives rise to changing unit cell size and local distortions in crystal structure, providing the advantages discussed herein.

Ionic radii referred to herein are the Shannon ionic radii (available at reference 7) at the coordination and valency that the ion would be expected to adopt in the crystal structure of the active electrode material. For example, the crystal structure of $PNb_9O_{25}$ includes $Nb^{5+}O_6$ octahedra and $P^{5+}O_4$ tetrahedra.

The amount of M1 is defined by a, meeting the criterion $0 \leq a \leq 0.5$. a may be $0 \leq a \leq 0.3$, preferably $0 \leq a \leq 0.2$. In each of these cases a may be >0, for example >0.01.

M2 is a cation which substitutes for Nb in the crystal structure. M2 may be selected from Ti, Zr, Hf, V, Ta, Cr, Mo, W, Mn, Fe, Co, Ni, Cu, Zn, B, Al, Ga, Si, Ge, Sn, Bi, P, Sb, and mixtures thereof; or Ti, Zr, Hf, Cr, Mo, W, V, Ta, and mixtures thereof; or Ti, Mo, and mixtures thereof. Preferably, M2 is not P. Preferably, M2 is not Na. M2 may have a different valency than $Nb^{5+}$. This gives rise to oxygen deficiency or excess. Preferably, M2 has a lower valency than $Nb^{5+}$. This gives rise to oxygen deficiency, i.e. the presence of oxygen vacancies providing the advantages discussed herein. M2 preferably has a different ionic radius than $Nb^{5+}$, most preferably a larger ionic radius. This gives rise to changing unit cell size and local distortions in crystal structure, providing the advantages discussed herein.

The amount of M2 is defined by b, meeting the criterion $0 \le b \le 2$. b may be $0 \le b \le 1.5$, preferably $0 \le b \le 1$, or $0 \le b \le 0.9$. In each of these cases b may be >0, for example >0.01.

Preferably, at least one of a and b is >0. Both of a and b can be >0.

c reflects the oxygen content of the active electrode material. When c is greater than 0, it forms an oxygen-deficient material, i.e. the material has oxygen vacancies. Such a material would not have precise charge balance without changes to cation oxygen state, but is considered to be "substantially charge balanced" as indicated above. Alternatively, c may equal 0, in which it is not an oxygen-deficient material. c may be below 0, which is a material with oxygen-excess. c may be $-0.25 \le c \le 1.25$. Preferably c is $0 \le c \le 1.25$. Optionally, if $a=b=0$ then $c \ge 0$; preferably if $a=b=0$ then $c>0$.

When c is 1.25, the number of oxygen vacancies is equivalent to 5% of the total oxygen in the crystal structure. c may be greater than 0.0125 (0.05% oxygen vacancies), greater than 0.025 (0.1% oxygen vacancies), greater than 0.05 (0.2% oxygen vacancies), or greater than 0.125 (0.5% oxygen vacancies). c may be between 0 and 1 (4% oxygen vacancies), between 0 and 0.75 (3% oxygen vacancies), between 0 and 0.5 (2% oxygen vacancies), or between 0 and 0.25 (1% oxygen vacancies). For example, c may satisfy $0.01 \le c \le 1.25$. When the material is oxygen-deficient, the electrochemical properties of the material may be improved, for example, resistance measurements may show improved conductivity in comparison to equivalent non-oxygen-deficient materials. As will be understood, the percentage values expressed herein are in atomic percent.

The invention relates to phosphorus niobium oxides comprising oxygen vacancies (oxygen-deficient phosphorus niobium oxides), or having oxygen excess. Oxygen vacancies may be formed in a phosphorus niobium oxide by the sub-valent substitution of a base material as described above, and oxygen excess may be formed in a phosphorus niobium oxide by substitution for increased valency. Oxygen vacancies may also be formed by heating a phosphorus niobium oxide under reducing conditions, optionally without cation substitution. Therefore, the phosphorus niobium oxide active electrode material may have the composition $P_xNb_9O_{25-c-d}Q_d$ where x, c, d, and Q are as defined herein. The amount of oxygen vacancies and excess may be expressed relative to the total amount of oxygen in the base material, i.e. the amount of oxygen in the un-substituted material (e.g. $PNb_9O_{25}$) or the material before heating under reducing conditions.

A number of methods exist for determining whether oxygen vacancies are present in a material. For example, Thermogravimetric Analysis (TGA) may be performed to measure the mass change of a material when heated in air atmosphere. A material comprising oxygen vacancies can increase in mass when heated in air due to the material "re-oxidising" and the oxygen vacancies being filled by oxide anions. The magnitude of the mass increase may be used to quantify the concentration of oxygen vacancies in the material, on the assumption that the mass increase occurs entirely due to the oxygen vacancies being filled. It should be noted that a material comprising oxygen vacancies may show an initial mass increase as the oxygen vacancies are filled, followed by a mass decrease at higher temperatures if the material undergoes thermal decomposition. Moreover, there may be overlapping mass loss and mass gain processes, meaning that some materials comprising oxygen vacancies may not show a mass gain (and sometimes not a mass loss or gain) during TGA analysis.

Other methods of determining whether oxygen vacancies are present include electron paramagnetic resonance (EPR), X-ray photoelectron spectroscopy (XPS, e.g. of oxygen 1 s and/or of cations in a mixed oxide), X-ray absorption near-edge structure (XANES, e.g. of cations in a mixed metal oxide), and TEM (e.g. scanning TEM (STEM) equipped with high-angle annular darkfield (HAADF) and annular bright-field (ABF) detectors). The presence of oxygen vacancies can be qualitatively determined by assessing the colour of a material relative to a non-oxygen-deficient sample of the same material, indicative of changes to its electronic band structure through interaction with light. For example, stoichiometric $PNb_9O_{25}$ has a white or off-white colour whereas oxygen-deficient $PNb_9O_{24.990}$ has a light blue colour. The presence of vacancies can also be inferred from the properties, e.g. electrical conductivity, of a stoichiometric material compared to those of an oxygen-deficient material.

When d>0, additional anions Q are introduced into the phosphorus niobium oxide. Due to their differing electronic structure (i.e. $F^-$ vs $O^{2-}$), and differing ionic radii (6-coordinate $O^{2-}$=1.40 Å, 6-coordinate $F^-$=1.33 Å they may improve electrochemical performance in the active material.[7] This is due to altering unit cell characteristics with differing ionic radii allowing for improved Li ion capacity, or improved Coulombic efficiencies by improving reversibility. They may additionally improve electrical conductivity as for oxygen vacancy defects, or sub-valent cation substitutions, by altering the electronic structure of the crystal (i.e. doping effects). d may be $0 \le d \le 2.5$, or $0 \le d \le 1$. In each of these cases d may be >0. Q may be selected from F, Cl, N, S, and mixtures thereof; or F, N, and mixtures thereof; or Q is N.

Optionally $d=0$, in which case the material has the composition $M1_aP_{x-a}M2_bNb_{9-b}O_{25-c}$ where M1, M2, a, b, c, and x are as defined herein. Advantageously, materials where $d=0$ are free from anion Q and may be easier to synthesise.

x reflects the amount of phosphorus in the material, meeting the criterion $1 \le x \le 2$. x may be $1 \le x \le 1.25$. Preferably, $x=1$. When $x=1$ the composition is based on the crystal structure of $PNb_9O_{25}$.

It will be understood that the discussion of the variables of the composition (M1, M2, Q, a, b, c, d, and x) is intended to be read in combination. For example, preferably M1 is selected from Ti, Zr, Hf, V, Nb, Ta, Cr, Mo, W, Mn, Fe, Co, Ni, Cu, Zn, B, Al, Ga, Si, Ge, Sn, Bi, Sb, and mixtures thereof and M2 is selected from Ti, Zr, Hf, V, Ta, Cr, Mo, W, Mn, Fe, Co, Ni, Cu, Zn, B, Al, Ga, Si, Ge, Sn, Bi, P, Sb, and mixtures thereof. M1 may be selected from Ti, Zr, Hf, Cr, Mo, W, B, Al, Ga, Bi, Sb, and mixtures thereof and M2 may be selected from Ti, Zr, Hf, Cr, Mo, W, V, Ta, and mixtures thereof. M1 may be selected from Ti, Mo, Al, B, and mixtures thereof and M2 may be selected from Ti, Mo, and mixtures thereof. M1 is preferably not Nb and M2 is preferably not P. M1 and M2 are preferably not Na. M1 and M2 may be different. a may be 0≤a≤0.3 and b may be 0≤b≤1.5. Preferably 0≤a≤0.2 and 0≤b≤1. In each of these cases a and/or b may be >0.

For example, the phosphorus niobium oxide active electrode material may have the composition $M1_aP_{x-a}M2_bNb_{9-b}O_{25-c-d}Q_d$, wherein:

M1 is selected from Ti, Zr, Hf, V, Ta, Cr, Mo, W, Mn, Fe, Co, Ni, Cu, Zn, B, Al, Ga, Si, Ge, Sn, Bi, Sb, and mixtures thereof;

M2 is selected from Ti, Zr, Hf, V, Ta, Cr, Mo, W, Mn, Fe, Co, Ni, Cu, Zn, B, Al, Ga, Si, Ge, Sn, Bi, Sb, and mixtures thereof;

Q is selected from F, Cl, N, S, and mixtures thereof;

0≤a≤0.3; 0≤b≤1.5; −0.25≤c≤1.25; 0≤d≤2.5; 1≤x≤1.25;

one or more of a, b, c, and d does not equal 0.

For example, the phosphorus niobium oxide active electrode material may have the composition $M1_aP_{1-a}M2_bNb_{9-b}O_{25-c-d}Q_d$, wherein:

M1 is selected from Ti, Zr, Hf, V, Ta, Cr, Mo, W, Mn, Fe, Co, Ni, Cu, Zn, B, Al, Ga, Si, Ge, Sn, Bi, Sb, and mixtures thereof;

M2 is selected from Ti, Zr, Hf, V, Ta, Cr, Mo, W, Mn, Fe, Co, Ni, Cu, Zn, B, Al, Ga, Si, Ge, Sn, Bi, Sb, and mixtures thereof;

Q is selected from F, N, and mixtures thereof;

0≤a≤0.3; 0≤b≤1.5; 0≤c≤1.25; 0≤d≤2.5;

one or more of a, b, c, and d does not equal 0.

For example, the phosphorus niobium oxide active electrode material may have the composition $M1_aP_{1-a}M2_bNb_{9-b}O_{25-c-d}Q_d$, wherein:

M1 is selected from Ti, Zr, Hf, Cr, Mo, W, B, Al, Ga, Ge, Bi, Sb, and mixtures thereof;

M2 is selected from Ti, Zr, Hf, Cr, Mo, W, V, Ta, Ga, Ge, and mixtures thereof;

Q is selected from F, N, and mixtures thereof;

0≤a≤0.2; 0≤b≤1; 0≤c≤1.25; 0≤d≤2.5;

wherein at least one of a and b is >0.

The active electrode material may further comprise Li and/or Na. For example, Li and/or Na may enter the crystal structure when the active electrode material is used in a metal-ion battery electrode.

The active electrode material is preferably in particulate form. The material may have a $D_{50}$ particle diameter in the range of 0.1-100 μm, or 0.5-50 μm, or 1-20 μm. These particle sizes are advantageous because they are easy to process and fabricate into electrodes. Moreover, these particle sizes avoid the need to use complex and/or expensive methods for providing nanosized particles. Nanosized particles (e.g. particles having a $D_{50}$ particle diameter of 100 nm or less) are typically more complex to synthesise and require additional safety considerations.

The active electrode material may have a $D_{10}$ particle diameter of at least 0.05 μm, or at least 0.1 μm, or at least 0.5 μm, or at least 1 μm. By maintaining a $D_{10}$ particle diameter within these ranges, the potential for parasitic reactions in a Li ion cell is reduced from having reduced surface area, and it is easier to process with less binder in the electrode slurry.

The active electrode material may have a $D_{90}$ particle diameter of no more than 200 μm, no more than 100 μm, no more than 50 μm, or no more than 20 μm. By maintaining a $D_{90}$ particle diameter within these ranges, the proportion of the particle size distribution with large particle sizes is minimised, making the material easier to manufacture into a homogenous electrode.

The term "particle diameter" refers to the equivalent spherical diameter (esd), i.e. the diameter of a sphere having the same volume as a given particle, where the particle volume is understood to include the volume of any intra-particle pores. The terms "$D_n$" and "$D_n$ particle diameter" refer to the diameter below which n % by volume of the particle population is found, i.e. the terms "$D_{50}$" and "$D_{50}$ particle diameter" refer to the volume-based median particle diameter below which 50% by volume of the particle population is found. Where a material comprises primary crystallites agglomerated into secondary particles, it will be understood that the particle diameter refers to the diameter of the secondary particles. Particle diameters can be determined by laser diffraction. For example, particle diameters can be determined in accordance with ISO 13320:2009.

The active electrode material may have a BET surface area in the range of 0.1-100 m²/g, or 0.5-50 m²/g, or 1-20 m²/g. In general, a low BET surface area is preferred in order to minimise the reaction of the active electrode material with the electrolyte, e.g. minimising the formation of solid electrolyte interphase (SEI) layers during the first charge-discharge cycle of an electrode comprising the material. However, a BET surface area which is too low results in unacceptably low charging rate and capacity due to the inaccessibility of the bulk of the active electrode material to metal ions in the surrounding electrolyte.

The term "BET surface area" refers to the surface area per unit mass calculated from a measurement of the physical adsorption of gas molecules on a solid surface, using the Brunauer-Emmett-Teller theory. For example, BET surface areas can be determined in accordance with ISO 9277:2010.

The specific capacity/reversible delithiation capacity of the active electrode materials may be 180 mAh/g or more, 190 mAh/g or more, up to about 200 mAh/g or more. Here, specific capacity is defined as that measured in the 2nd cycle of a half cell galvanostatic cycling test at a rate of 0.1C with a voltage window of 1.0-3.0V vs Li/Li+ in a half cell. It may be advantageous to provide materials having a high specific capacity, as this can provide improved performance in an electrochemical device comprising the active electrode material.

When formulated or coated as an electrode according to the below description (optionally with conductive carbon additive and binder materials), the sheet resistance of the active electrode materials may be 750 Ω per square or less, more preferably 675 Ω per square or less. Sheet resistance can be a useful proxy measurement of the electronic conductivity of such materials. It may be advantageous to provide materials having a suitably low sheet resistance, as this can provide improved performance in an electrochemical device comprising the active electrode material.

The active electrode material may have a lithium diffusion rate greater than $10^{-14}$ cm² s$^{-1}$, or more preferably greater than $10^{-12}$ cm² s$^{-1}$. It may be advantageous to provide materials having a suitably high lithium diffusion rate, as this can provide improved performance in an electrochemical device comprising the active electrode material.

The active electrode material may be able to form composite electrodes with a suitable binder and conductive additive according to the below description to provide an electrode density of 2.5 g/cm³ or more after calendaring. This enables a composite electrode with an electrode porosity (calculated by the measured electrode density/average of the true density of each component) in the range of 30-40%, in-line with industrial requirements for high energy and high power cells. For example, electrode densities of up to 3.2 g/cm³ have been achieved. It may be advantageous to provide materials having such an electrode density, as this can provide improved performance in an electrochemical device comprising the active electrode material. Specifically, when the electrode density is high, high volumetric capacities can be achieved, as gravimetric capacity×electrode density×active electrode material fraction=volumetric capacity.

Initial coulombic efficiency has been measured as the difference in the lithiation and de-lithiation capacity on the $1^{st}$ charge/discharge cycle at C/10 in a half-cell. The initial coulombic efficiency of the active electrode material may be greater than 90%, or greater than 92.5%, or greater than 95%. It may be advantageous to provide materials having a suitably high initial coulombic efficiency, as this can provide improved performance in an electrochemical device comprising the active electrode material.

The invention also provides a composition comprising the active electrode material of the first aspect of the invention and at least one other component, optionally wherein the at least one other component is selected from a binder, a solvent, a conductive additive, an additional active electrode material, and mixtures thereof. Such a composition is useful for preparing an electrode, e.g. an anode for a lithium-ion battery. The additional active electrode material may be selected from lithium titanium oxides, niobium oxides, and mixtures thereof.

The composition may comprise a mixture of the active electrode material of the first aspect of the invention and a lithium titanium oxide.

The lithium titanium oxide preferably has a spinel or ramsdellite crystal structure, e.g. as determined by X-ray diffraction. An example of a lithium titanium oxide having a spinel crystal structure is $Li_4Ti_5O_{12}$. An example of a lithium titanium oxide having a ramsdellite crystal structure is $Li_2Ti_3O_7$. These materials have been shown to have good properties for use as active electrode materials. Therefore, the lithium titanium oxide may have a crystal structure as determined by X-ray diffraction corresponding to $Li_4Ti_5O_{12}$ and/or $Li_2Ti_3O_7$. The lithium titanium oxide may be selected from $Li_4Ti_5O_{12}$, $Li_2Ti_3O_7$, and mixtures thereof.

The lithium titanium oxide may be doped with additional cations or anions. The lithium titanium oxide may be oxygen deficient. The lithium titanium oxide may comprise a coating, optionally wherein the coating is selected from carbon, polymers, metals, metal oxides, metalloids, phosphates, and fluorides.

The lithium titanium oxide may be synthesised by conventional ceramic techniques, for example solid-state synthesis or sol-gel synthesis. Alternatively, the lithium titanium oxide may be obtained from a commercial supplier.

The lithium titanium oxide is in preferably in particulate form. The lithium titanium oxide may have a $D_{50}$ particle diameter in the range of 0.1-50 µm, or 0.25-20 µm, or 0.5-15 µm. The lithium titanium oxide may have a $D_{10}$ particle diameter of at least 0.01 µm, or at least 0.1 µm, or at least 0.5 µm. The lithium titanium oxide may have a $D_{90}$ particle diameter of no more than 100 µm, no more than 50 µm, or no more than 25 µm. By maintaining a $D_{90}$ particle diameter in this range the packing of lithium titanium oxide particles in the mixture with active electrode material particles is improved.

Lithium titanium oxides are typically used in battery anodes at small particle sizes due to the low electronic conductivity of the material. In contrast, the active electrode material of the first aspect may be used at larger particle sizes since it typically has a higher lithium ion diffusion coefficient than lithium titanium oxide. Advantageously, in the composition the lithium titanium oxide may have a smaller particle size than the active electrode material, for example such that the ratio of the $D_{50}$ particle diameter of the lithium titanium oxide to the $D_{50}$ particle diameter of the active electrode material is in the range of 0.01:1 to 0.9:1, or 0.1:1 to 0.7:1. In this way, the smaller lithium titanium oxide particles may be accommodated in the voids between the larger active electrode material particles, increasing the packing efficiency of the composition.

The lithium titanium oxide may have a BET surface area in the range of 0.1-100 $m^2/g$, or 1-50 $m^2/g$, or 3-30 $m^2/g$.

The ratio by mass of the lithium titanium oxide to the active electrode material may be in the range of 0.5:99.5 to 99.5:0.5, preferably in the range of 2:98 to 98:2. In one implementation the composition comprises a higher proportion of the lithium titanium oxide than the active electrode material, e.g. the ratio by mass of at least 2:1, at least 5:1, or at least 8:1. Advantageously, this allows the active electrode material to be incrementally introduced into existing electrodes based on lithium titanium oxides without requiring a large change in manufacturing techniques, providing an efficient way of improving the properties of existing electrodes. In another implementation the composition has a higher proportion of the active electrode material than the lithium titanium oxide, e.g. such that the ratio by mass of the lithium titanium oxide to the active electrode material is less than 1:2, or less than 1:5, or less than 1:8. Advantageously, this allows for the cost to be reduced by replacing some of the active electrode material with lithium titanium oxide.

The composition may comprise a mixture of the active electrode material of the first aspect of the invention and a niobium oxide. The niobium oxide may be selected from $Nb_{12}O_{29}$, $NbO_2$, $NbO$, and $Nb_2O_5$. Preferably, the niobium oxide is $Nb_2O_5$.

The niobium oxide may be doped with additional cations or anions, for example provided that the crystal structure of the niobium oxide corresponds to the crystal structure of an oxide consisting of Nb and O, e.g. $Nb_{12}O_{29}$, $NbO_2$, $NbO$, and $Nb_2O_5$. The niobium oxide may be oxygen deficient. The niobium oxide may comprise a coating, optionally wherein the coating is selected from carbon, polymers, metals, metal oxides, metalloids, phosphates, and fluorides.

The niobium oxide may have the crystal structure of $Nb_{12}O_{29}$, $NbO_2$, $NbO$, or $Nb_2O_5$ as determined by X-ray diffraction. For example, the niobium oxide may have the crystal structure of orthorhombic $Nb_2O_5$ or the crystal structure of monoclinic $Nb_2O_5$. Preferably, the niobium oxide has the crystal structure of monoclinic $Nb_2O_5$, most preferably the crystal structure of H—$Nb_2O_5$. Further information on crystal structures of $Nb_2O_5$ may be found at Griffith et al., *J. Am. Chem. Soc.* 2016, 138, 28, 8888-8899.

The niobium oxide may be synthesised by conventional ceramic techniques, for example solid-state synthesis or sol-gel synthesis. Alternatively, the niobium oxide may be obtained from a commercial supplier.

The niobium oxide is in preferably in particulate form. The niobium oxide may have a $D_{50}$ particle diameter in the range of 0.1-100 µm, or 0.5-50 µm, or 1-20 µm. The niobium oxide may have a $D_{10}$ particle diameter of at least 0.05 µm, or at least 0.5 µm, or at least 1 µm. The niobium oxide may have a $D_{90}$ particle diameter of no more than 100 µm, no more than 50 µm, or no more than 25 µm. By maintaining a $D_{90}$ particle diameter in this range the packing of niobium oxide particles in the mixture with active electrode material particles is improved.

The niobium oxide may have a BET surface area in the range of 0.1-100 $m^2/g$, or 1-50 $m^2/g$, or 1-20 $m^2/g$.

The ratio by mass of the niobium oxide to the active electrode material may be in the range of 0.5:99.5 to 99.5:0.5, or in the range of 2:98 to 98:2, or preferably in the range of 15:85 to 35:55.

The invention also provides an electrode comprising the active electrode material of the first aspect of the invention in electrical contact with a current collector. The electrode may form part of a cell. The electrode may form an anode as part of a lithium-ion battery.

The invention also provides the use of the active electrode material of the first aspect of the invention in an anode for a metal-ion battery, optionally wherein the metal-ion battery is a lithium-ion battery.

A further implementation of the invention is an electrochemical device comprising an anode, a cathode, and an electrolyte disposed between the anode and the cathode, wherein the anode comprises an active electrode material according to the first aspect of the invention; optionally wherein the electrochemical device is a lithium-ion battery or a sodium-ion battery. Preferably, the electrochemical device is a lithium-ion battery having a reversible anode active material specific capacity of greater than 200 mAh/g at 20 mA/g, wherein the battery can be charged and discharged at current densities relative to the anode active material of 200 mA/g or more, or 1000 mA/g or more, or 2000 mA/g or more, or 4000 mA/g or more whilst retaining greater than 70% of the initial cell capacity at 20 mA/g. It has been found that use of the active electrode materials of the first aspect of the invention can enable the production of a lithium-ion battery with this combination of properties, representing a lithium-ion battery that is particularly suitable for use in applications where high charge and discharge current densities are desired. Notably, the examples have shown that active electrode materials according to the first aspect of the invention have excellent capacity retention at high C-rates.

The phosphorus niobium oxide active electrode material may be synthesised by conventional ceramic techniques. For example, the material be made by one or more of solid-state synthesis or sol-gel synthesis. The material may additionally be synthesised by one or more of alternative techniques commonly used, such as hydrothermal or microwave hydrothermal synthesis, solvothermal or microwave solvothermal synthesis, coprecipitation synthesis, spark or microwave plasma synthesis, combustion synthesis, electrospinning, and mechanical alloying.

The second aspect of the invention provides a method of making an active electrode material as defined by the first aspect, the method comprising steps of: providing one or more precursor materials; mixing said precursor materials to form a precursor material mixture; and heat treating the precursor material mixture in a temperature range from 400° C.-1350° C. or 800-1350° C., thereby providing the active electrode material.

To provide an active electrode material comprising element Q the method may further comprise the steps of: mixing the active electrode material with a precursor comprising element Q to provide a further precursor material mixture; and heat treating the further precursor material mixture in a temperature range from 400-1200° C. or 800-120° C. optionally under reducing conditions, thereby providing the active electrode material comprising element Q.

The method may comprise the further step of heat treating the active electrode material or the active electrode material comprising element Q in a temperature range from 400-1350° C. or 800-1350° C. under reducing conditions, thereby introducing oxygen vacancies into the active electrode material. The oxygen vacancies may be in addition to oxygen vacancies already present in the active electrode material, e.g. already present due to sub-valent substitution of P and/or Nb with M1 and/or M2. Alternatively, the oxygen vacancies may be new oxygen vacancies, e.g. if M1 and M2 have the same valency as P and Nb or if M1 and M2 are not present. The presence of oxygen vacancies provides the advantages discussed herein.

The precursor materials may include one or more metal oxides, metal hydroxides, metal salts or ammonium salts. For example, the precursor materials may include one or more metal oxides or metal salts of different oxidation states and/or of different crystal structure. Examples of suitable precursor materials include but are not limited to: $Nb_2O_5$, $Nb(OH)_5$, Niobic Acid, NbO, Ammonium Niobate Oxalate, $NH_4H_2PO_4$, $(NH_4)_2PO_4$, $(NH_4)_3PO_4$, $P_2O_5$, $H_3PO_3$, $Ta_2O_5$, $WO_3$, $ZrO_2$, $TiO_2$, $MoO_3$, $V_2O_5$, $ZrO_2$, $CuO$, $ZnO$, $Al_2O_3$, $K_2O$, $KOH$, $CaO$, $GeO_2$, $Ga_2O_3$, $SnO_2$, $CoO$, $Co_2O_3$, $Fe_2O_3$, $Fe_3O_4$, $MnO$, $MnO_2$, $NiO$, $Ni_2O_3$, $H_3BO_3$, $ZnO$, and $MgO$. The precursor materials may not comprise a metal oxide, or may comprise ion sources other than oxides. For example, the precursor materials may comprise metal salts (e.g. $NO_3^-$, $SO_3^-$) or other compounds (e.g. oxalates). For the substitution of the oxygen anion with other electronegative anions Q, the precursors comprising element Q may include one or more organic compounds, polymers, inorganic salts, organic salts, gases, or ammonium salts. Examples of suitable precursor materials comprising element Q include but are not limited to: melamine, $NH_4HCO_3$, $NH_3$, $NH_4F$, PVDF, PTFE, $NH_4Cl$, $NH_4Br$, $NH_4I$, $Br_2$, $Cl_2$, $I_2$, ammonium oxychloride amide, and hexamethylenetetramine.

Some or all of the precursor materials may be particulate materials. Where they are particulate materials, preferably they have a $D_{50}$ particle diameter of less than 20 μm in diameter, for example from 10 nm to 20 μm. Providing particulate materials with such a particle diameter can help to promote more intimate mixing of precursor materials, thereby resulting in more efficient solid-state reaction during the heat treatment step. However, it is not essential that the precursor materials have an initial particle size of <20 μm in diameter, as the particle size of the one or more precursor materials may be mechanically reduced during the step of mixing said precursor materials to form a precursor material mixture.

The step of mixing the precursor materials to form a precursor material mixture and/or further precursor material mixture may be performed by a process selected from (but not limited to): dry or wet planetary ball milling, rolling ball milling, high energy ball milling, high shear milling, air jet milling, steam jet milling, and/or impact milling. The force used for mixing/milling may depend on the morphology of the precursor materials. For example, where some or all of the precursor materials have larger particle sizes (e.g. a $D_{50}$ particle diameter of greater than 20 μm), the milling force may be selected to reduce the particle diameter of the precursor materials such that the such that the particle diameter of the precursor material mixture is reduced to 20 μm in diameter or lower. When the particle diameter of particles in the precursor material mixture is 20 μm or less, this can promote a more efficient solid-state reaction of the precursor materials in the precursor material mixture during the heat treatment step.

The step of heat treating the precursor material mixture and/or the further precursor material mixture may be performed for a time of from 1 hour to 24 hours, more preferably from 3 hours to 18 hours. For example, the heat treatment step may be performed for 1 hour or more, 2 hours or more, 3 hours or more, 6 hours or more, or 12 hours or more. The heat treatment step may be performed for 24 hours or less, 18 hours or less, 16 hours or less, or 12 hours or less.

The step of heat treating the precursor material mixture may be performed in a gaseous atmosphere, preferably air. Suitable gaseous atmospheres include: air, $N_2$, Ar, He, $CO_2$, CO, $O_2$, $H_2$, $NH_3$ and mixtures thereof. The gaseous atmosphere may be a reducing atmosphere. Where it is desired to make an oxygen-deficient material, preferably the step of heat treating the precursor material mixture is performed in an inert or reducing atmosphere.

The step of heat treating the further precursor material mixture may be performed under reducing conditions, for example when Q is N. Reducing conditions include under an inert gas such as nitrogen, helium, argon; or under a mixture of an inert gas and hydrogen; or under vacuum. Preferably, the step of heat treating the further precursor material mixture comprises heating under inert gas. Alternatively, the step of heat treating the further precursor material mixture may be performed in air, for example when Q is F.

The further step of heat treating the active electrode material and/or the active electrode material comprising element Q optionally under reducing conditions may be performed for a time of from 1 hour to 48 hours, 1 hour to 24 hours, more preferably from 3 hours to 18 hours. For example, the heat treatment step may be performed for 1 hour or more, 2 hours or more, 3 hours or more, 6 hours or more, or 12 hours or more. The further step heat treating may be performed for 48 hours or less, 24 hours or less, 18 hours or less, 16 hours or less, or 12 hours or less. Reducing conditions include under an inert gas such as nitrogen, helium, argon; or under a mixture of an inert gas and hydrogen; or under vacuum. Preferably heating under reducing conditions comprises heating under inert gas.

In some methods it may be beneficial to perform a two-step heat treatment. For example, the precursor material mixture and/or the further precursor material mixture may be heated at a first temperature for a first length of time, follow by heating at a second temperature for a second length of time. Preferably the second temperature is higher than the first temperature. Performing such a two-step heat treatment may assist the solid-state reaction to form the desired crystal structure.

The method may include one or more post-processing steps after formation of the phosphorus niobium oxide active electrode material. In some cases, the method may include a post-processing step of heat treating the phosphorus niobium oxide, sometimes referred to as 'annealing'. This post-processing heat treatment step may be performed in a different gaseous atmosphere to the step of heat treating the precursor material mixture to form the phosphorus niobium oxide. The post-processing heat treatment step may be performed in an inert or reducing gaseous atmosphere. Such a post-processing heat treatment step may be performed at temperatures of above 500° C., for example at about 900° C. Inclusion of a post-processing heat treatment step may be beneficial to e.g. form deficiencies or defects in the phosphorus niobium oxide, for example to form oxygen deficiencies; or to carry out anion exchange on the formed phosphorus niobium oxide e.g. N exchange for the O anion.

The method may include a step of milling and/or classifying the phosphorus niobium oxide active electrode material (e.g. impact milling, jet milling, steam jet milling, high energy milling, high shear milling) to provide a material with any of the particle size parameters given above.

There may be a step of carbon coating the phosphorus niobium oxide active electrode material to improve its surface electrical conductivity, or to prevent reactions with electrolyte. This is typically comprised of combining the phosphorus niobium oxide with a carbon precursor to form an intermediate material that may comprise milling, preferably high energy milling. Alternatively or in addition, the step may comprise mixing the phosphorus niobium oxide with the carbon precursor in a solvent, such as water, ethanol or THF. These represent efficient methods of ensuring uniform mixing of the phosphorus niobium oxide with the carbon precursor.

It has been found that a carbon precursor comprising polyaromatic sp2 carbon provides a particularly beneficial carbon coating on active electrode materials of the first aspect of the invention. Therefore, the method of making an active electrode material may further comprise the steps of: combining the active electrode material or the active electrode material comprising element Q with a carbon precursor comprising polyaromatic sp2 carbon to form an intermediate material; and heating the intermediate material under reducing conditions to pyrolyse the carbon precursor forming a carbon coating on the active electrode material and introducing oxygen vacancies into the active electrode material.

The intermediate material may comprise the carbon precursor in an amount of up to 25 wt %, or 0.1-15 wt %, or 0.2-8 wt %, based on the total weight of the active electrode material and the carbon precursor. The carbon coating on the active electrode material may be present in an amount of up to 10 wt %, or 0.05-5 wt %, or 0.1-3 wt %, based on the total weight of the active electrode material. These amounts of the carbon precursor and/or carbon coating provide a good balance between improving the electronic conductivity by the carbon coating without overly reducing the capacity of the active electrode material by overly reducing the proportion of the phosphorus niobium oxide. The mass of carbon precursor lost during pyrolysis may be in the range of 30-70 wt %.

The step of heating the intermediate material under reducing conditions may be performed at a temperature in the range of 400-1,200° C., or 500-1,100° C., or 600-900° C. The step of heating the intermediate material under reducing conditions may be performed for a duration within the range of 30 minutes to 12 hours, 1-9 hours, or 2-6 hours.

The step of heating the intermediate material under reducing conditions may be performed under an inert gas such as nitrogen, helium, argon; or may be performed under a mixture of an inert gas and hydrogen; or may be performed under vacuum.

The carbon precursor comprising polyaromatic sp2 carbon may be selected from pitch carbons, graphene oxide, graphene, and mixtures thereof. Preferably, the carbon precursor comprising polyaromatic sp2 carbon is selected from pitch carbons, graphene oxide, and mixtures thereof. Most preferably, the carbon precursor comprising polyaromatic sp2 carbon is selected from pitch carbons. The pitch carbons may be selected from coal tar pitch, petroleum pitch, mesophase pitch, wood tar pitch, isotropic pitch, bitumen, and mixtures thereof.

Pitch carbon is a mixture of aromatic hydrocarbons of different molecular weights. Pitch carbon is a low cost by-product from petroleum refineries and is widely available. The use of pitch carbon is advantageous because pitch has a low content of oxygen. Therefore, in combination with heating the intermediate material under reducing conditions, the use of pitch favours the formation of oxygen vacancies in the phosphorus niobium oxide.

Other carbon precursors typically contain substantial amounts of oxygen. For example, carbohydrates such as glucose and sucrose are often used as carbon precursors. These have the empirical formula $C_m(H_2O)_n$ and thus contain a significant amount of covalently-bonded oxygen (e.g. sucrose has the formula $C_{12}H_{22}O_{11}$ and is about 42 wt % oxygen). The pyrolysis of carbon precursors which contain substantial amounts of oxygen is believed to prevent or inhibit reduction of a phosphorus niobium oxide, or even lead to oxidation, meaning that oxygen vacancies may not be introduced into the phosphorus niobium oxide. Accordingly, the carbon precursor may have an oxygen content of less than 10 wt %, preferably less than 5 wt %.

The carbon precursor may be substantially free of $sp^3$ carbon. For example, the carbon precursor may comprise less than 10 wt % sources of $sp^3$ carbon, preferably less than 5 wt % sources of $sp^3$ carbon. Carbohydrates are sources of $sp^3$ carbon. The carbon precursor may be free of carbohydrates. It will be understood that some carbon precursors used in the invention may contain impurities of $sp^3$ carbon, for example up to 3 wt %.

The active electrode material of the first aspect of the invention may comprise a carbon coating. Preferably the carbon coating comprises polyaromatic $sp^2$ carbon. Such a coating is formed by pyrolysing a carbon precursor comprising polyaromatic $sp^2$ carbon since the $sp^2$ hybridisation is largely retained during pyrolysis. Typically, pyrolysis of a polyaromatic $sp^2$ carbon precursor under reducing conditions results in the domains of $sp^2$ aromatic carbon increasing in size. Accordingly, the presence of a carbon coating comprising polyaromatic $sp^2$ may be established via knowledge of the precursor used to make the coating. The carbon coating may be defined as a carbon coating formed from pyrolysis of a carbon precursor comprising polyaromatic $sp^2$ carbon. Preferably, the carbon coating is derived from pitch carbons.

The presence of a carbon coating comprising polyaromatic $sp^2$ carbon may also be established by routine spectroscopic techniques. For instance, Raman spectroscopy provides characteristic peaks (most observed in the region 1,000-3,500 $cm^{-1}$) which can be used to identify the presence of different forms of carbon. A highly crystalline sample of $sp^3$ carbon (e.g. diamond) provides a narrow characteristic peak at ~1332 $cm^{-1}$. Polyaromatic $sp^2$ carbon typically provides characteristic D, G, and 2D peaks. The relative intensity of D and G peaks ($I_D/I_G$) can provide information on the relative proportion of $sp^2$ to $sp^3$ carbon. The active electrode material may have an $I_D/I_G$ ratio as observed by Raman spectroscopy within the range of 0.85-1.15, or 0.90-1.10, or 0.95-1.05.

X-ray diffraction may also be used to provide information on the type of carbon coating. For example, an XRD pattern of a phosphorus niobium oxide with a carbon coating may be compared to an XRD pattern of the uncoated phosphorus niobium oxide and/or to an XRD pattern of a pyrolysed sample of the carbon precursor used to make the carbon coating.

The carbon coating may be semi-crystalline. For example, the carbon coating may provide a peak in an XRD pattern of the active electrode material centred at 2θ of about 26° with a width (full width at half maximum) of at least 0.20°, or at least 0.25°, or at least 0.30°.

EXAMPLES

The base phosphorus niobium oxide material was synthesised by a solid-state route. In a first step precursor materials ($Nb_2O_5$, $NH_4H_2PO_4$, $TiO_2$, $MoO_3$, $H_3BO_3$, $Al_2O_3$, $ZrO_2$, $GeO_2$, $Ga_2O_3$, $Cr_2O_3$) were mixed in stoichiometric proportions (350 g total) and ball-milled at 550 rpm with a ball to powder ratio of 10:1 for 3 h. The resulting powders were heat treated in an alumina crucible in a muffle furnace in air at $T_{1a}$=250-600° C. for 1-12 h followed by $T_{1b}$=800-1350° C. for 4-24 h, providing the desired Wadsley-Roth phase. An additional heat treatment step was also applied in some cases under a $N_2$ atmosphere at $T_2$=800-1350° C. for 1-12 h to result in induced oxygen deficiencies (oxygen vacancies) in the base crystal structure. For inclusion of anions, there was an additional milling/mixing step with the precursor ($NH_4HCO_3$ for N in a 1:3 mass ratio, PVDF for F in a 1:10 mass ratio) prior to heat treatment in a $N_2$ atmosphere for N and an air atmosphere for F at $T_2$=400-1200° C. for 1-24 h.

A final de-agglomeration step was utilised by impact milling or jet milling to adjust to the desired particle size distribution where necessary. Specifically, the material was de-agglomerated by impact milling at 20,000 RPM for 10 seconds.

TABLE 1

A summary of the materials synthesised. Particle size distribution has been evaluated by dry powder laser diffraction.

| Sample | Material | $T_{1a}$ (° C.; h) | $T_{1b}$ (° C.; h) | $T_2$ (° C.; h) | D10 (μm) | D50 (μm) | D90 (μm) |
|---|---|---|---|---|---|---|---|
| 1* | $PNb_9O_{25}$ | 380; 6 | 1200; 12 | — | 2.7 | 5.7 | 11.0 |
| 2 | $PNb_9O_{24.990}$** | 380; 6 | 1200; 24 | 1200; 5 | 4.0 | 6.9 | 11.5 |
| 3 | $Ti_{0.05}Mo_{0.05}P_{0.90}Nb_9O_{25}$ | 380; 6 | 1200; 12 | — | 2.6 | 5.4 | 10.0 |
| 4 | $PTi_{0.45}Mo_{0.45}Nb_{8.10}O_{25}$ | 380; 6 | 1200; 12 | — | 3.9 | 6.8 | 12.1 |
| 5 | $PTi_{0.225}Mo_{0.225}Nb_{8.45}O_{25}$ | 380; 6 | 1200; 16 | — | 3.7 | 6.6 | 11.7 |
| 6 | $Al_{0.05}P_{0.95}Ti_{0.225}Mo_{0.225}Nb_{8.55}O_{24.95}$** | 380; 6 | 1200; 16 | — | 4.5 | 7.9 | 13.5 |
| 7 | $Al_{0.05}P_{0.95}Ti_{0.225}Mo_{0.225}Nb_{8.55}O_{24.937}$** | 380; 6 | 1200; 12 | 1200; 5 | 4.2 | 7.0 | 11.7 |
| 8 | $PTi_{0.225}Mo_{0.225}Nb_{8.55}O_{25-d}N_d$ | 380; 6 | 1200; 16 | 900; 1 | 5.0 | 9.0 | 17.6 |
| 9 | $B_{0.05}P_{0.95}Nb_9O_{24.95}$** | 380; 6 | 1200; 12 | — | 2.8 | 6.0 | 11.3 |
| 10 | $PNb_9O_{25-d}F_d$ | 380; 6 | 1200; 12 | 435; 24 | 2.7 | 5.7 | 11 |
| 11 | $Mo_{0.05}P_{0.95}Nb_9O_{25.025}$** | 380; 6 | 1200; 12 | — | 2.5 | 4.8 | 8.5 |
| 12 | $PZr_{0.05}Nb_{8.95}O_{24.975}$** | 380; 6 | 1200; 12 | — | 2.4 | 5.5 | 12.1 |
| 13 | $PGe_{0.05}Nb_{8.95}O_{24.975}$** | 380; 6 | 1200; 12 | — | 2.6 | 5.7 | 13.9 |
| 14 | $Ge_{0.05}P_{0.95}Nb_9O_{24.975}$** | 380; 6 | 1200; 12 | — | 1.9 | 5.0 | 18.8 |
| 15 | $PGa_{0.05}Nb_{8.95}O_{24.95}$** | 380; 6 | 1200; 12 | — | 1.9 | 4.8 | 12.3 |
| 16 | $PCr_{0.05}Nb_{8.95}O_{24.95}$** | 380; 6 | 1200; 12 | — | 2.9 | 6.0 | 11.2 |
| 17 | $Cr_{0.05}P_{0.95}Nb_9O_{24.95}$** | 380; 6 | 1200; 12 | — | 2.9 | 5.8 | 10.9 |

*Comparative sample - unmodified

**Induced oxygen deficiency calculated from TGA mass loss, and inherent oxygen deficiency or excess calculated from cation or anion exchange assuming a charge-balanced structure and site-specific substitution.

Materials Characterisation

The phase purity of samples was analysed using a Rigaku Miniflex powder X-ray diffractometer in 2θ range)(20-70° at 1°/min scan rate.

Figure 1:
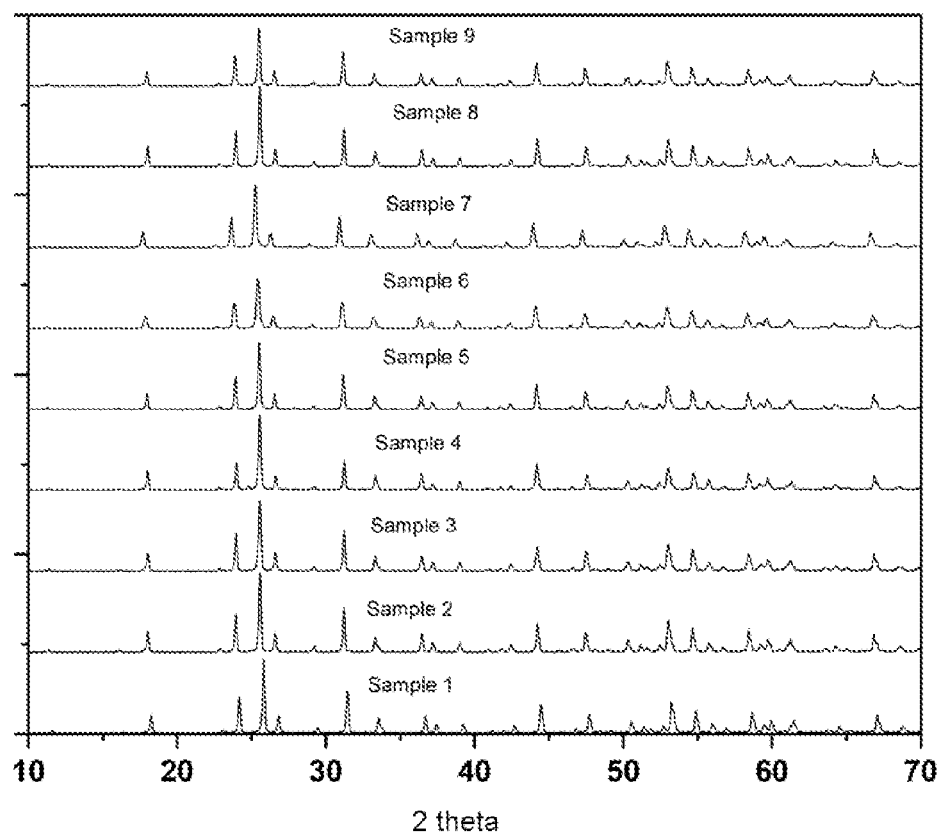
FIG. 1: Powder XRD of Sample 1-9.
Figure 2:
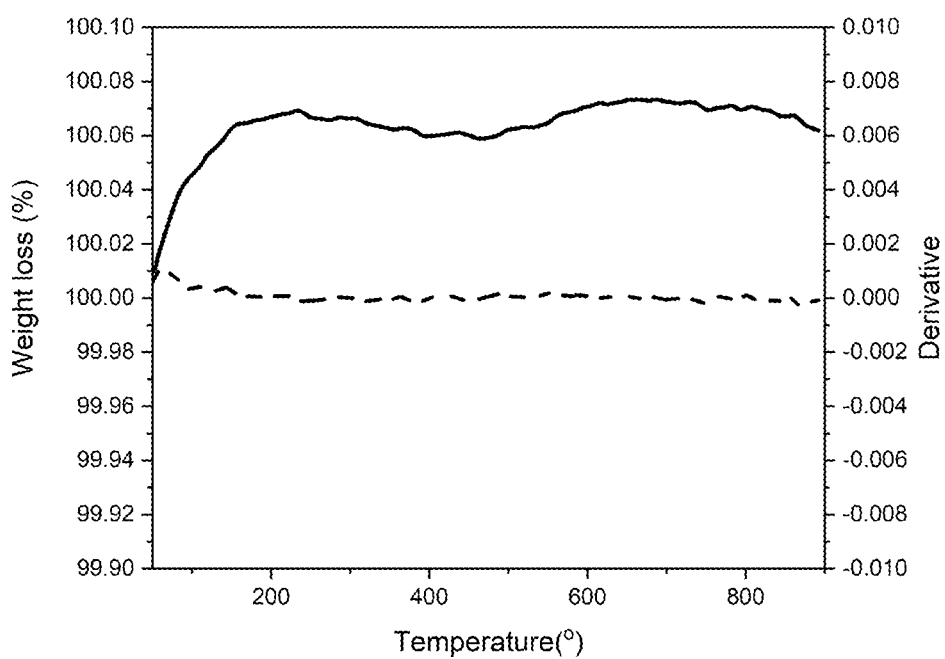
FIG. 2: TGA of Sample 2.
Figure 7:
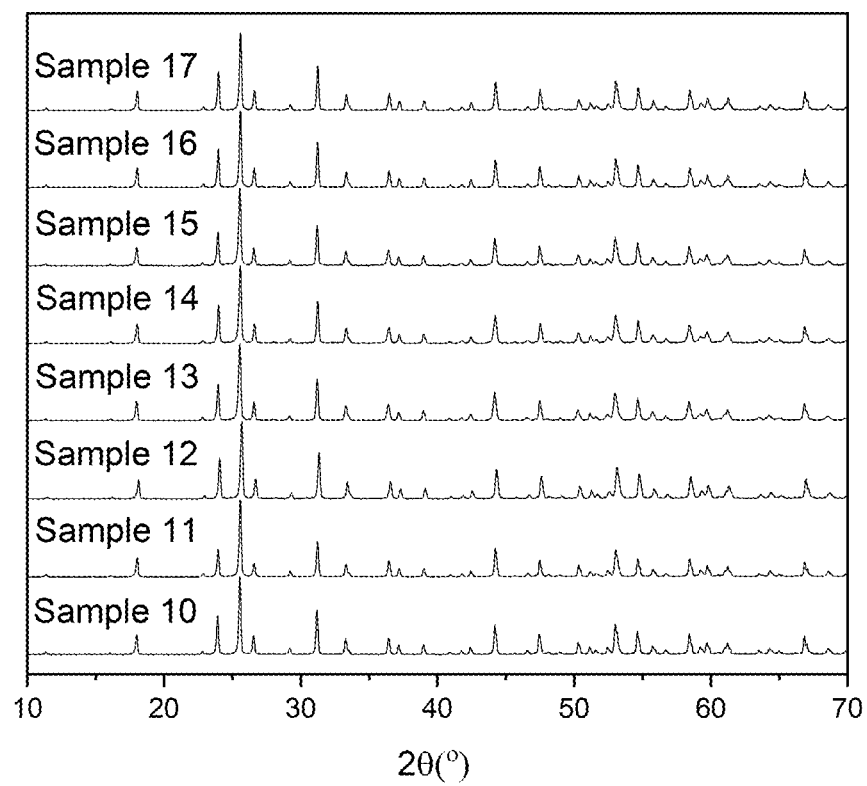
FIG. 7: Powder XRD of Samples 10-17.

FIG. 1 shows the measured XRD diffraction patterns for Samples 1-9. FIG. 7 shows the measured XRD diffraction patterns for Samples 10-17. Diffraction patterns have peaks at the same locations (with some shift due to doping, up to around)0.2°, and match ICDD crystallography database entry JCPDS 81-1304, which corresponds to $Pnb_9O_{25}$. There is no amorphous background noise and the peaks are sharp and intense. This means that all samples are phase-pure and crystalline, with crystallite size 30-60 nm according to the Scherrer equation and crystal structure matching $Pnb_9O_{25}$. This confirms the presence of a Wadsley-Roth crystal structure.

TABLE 2

A summary table of unit cell parameters for each sample calculated by Rietveld refinement of their powder XRD spectra with software GSASII, and average crystallite size calculated by the Scherrer equation across the spectra.

| Sample | a = b [Å] | c [Å] | α = β [°] | γ [°] | $\chi^2$** | Crystallite size [nm] |
|---|---|---|---|---|---|---|
| Reference[8] | 15.639 | 3.831 | 90 | 90 | — | — |
| 1* | 15.6237 | 3.8377 | 90 | 90 | 7.4 | 48 ± 5 |
| 2 | 15.6272 | 3.8373 | 90 | 90 | 4.0 | 51 ± 7 |
| 3 | 15.6312 | 3.8347 | 90 | 90 | 2.6 | 47 ± 9 |
| 4 | 15.6410 | 3.8312 | 90 | 90 | 4.2 | 47 ± 8 |
| 5 | 15.6319 | 3.8346 | 90 | 90 | 7.9 | 51 ± 8 |
| 6 | 15.6279 | 3.8328 | 90 | 90 | 3.5 | 35 ± 4 |
| 7 | 15.6225 | 3.8328 | 90 | 90 | 8.3 | 40 ± 6 |
| 8 | 15.6032 | 3.8355 | 90 | 90 | 2.4 | 49 ± 9 |
| 9 | 15.6292 | 3.8362 | 90 | 90 | 6.9 | 48 ± 8 |
| 10 | 15.6254 | 3.8381 | 90 | 90 | 4.8 | 53 ± 6 |
| 11 | 15.6154 | 3.8352 | 90 | 90 | 10.0 | 53 ± 7 |
| 12 | 15.6236 | 3.8338 | 90 | 90 | 10.0 | 51 ± 6 |
| 13 | 15.6228 | 3.8306 | 90 | 90 | 8.0 | 50 ± 6 |
| 14 | 15.6587 | 3.8400 | 90 | 90 | 5.8 | 48 ± 6 |
| 15 | 15.6299 | 3.8350 | 90 | 90 | 9.7 | 51 ± 8 |
| 16 | 15.6217 | 3.8362 | 90 | 90 | 5.0 | 53 ± 6 |
| 17 | 15.6359 | 3.8388 | 90 | 90 | 5.6 | 53 ± 8 |

**$\chi^2$ represents the goodness of fit and is a representation of how accurate the Rietveld refinement is, a value <10 supports the accuracy of the data.

Thermogravimetric Analysis (TGA) was performed on some samples using a Perkin Elmer Pyris 1 system in an air atmosphere. Samples were heated from 30° C. to 900° C. at 5° C./min and held at 900° C. for 30 mins, with an air flow of 20 mL/min. TGA was performed on samples 2, and 7 to quantify mass changes on oxidation. The mass gain measured was assumed to correspond to the degree of induced oxygen deficiency present.

TABLE 3

A summary of TGA analysis carried out on some samples in air.

| Sample | Mass gain by TGA analysis [w/w %] |
|---|---|
| 2 | 0.041 |
| 7 | 0.054 |

Particle Size Distributions were obtained with a Horiba laser diffraction particle analyser for dry powder. Air pressure was kept at 0.3 MPa. The results are set out in Table 1.

Electrochemical Characterisation

Li-ion cell charge rate is usually expressed as a "C-rate". A 1C charge rate means a charge current such that the cell is fully charged in 1 h, 10 C charge means that the battery is fully charged in ¹/₁₀th of an hour (6 minutes). C-rate hereon is defined from the reversible capacity of the anode within the voltage limits applied, i.e. for an anode that exhibits 1.0 mAh $cm^{-2}$ capacity within the voltage limits of 1.0-3.0 V, a 1 C rate corresponds to a current density applied of 1.0 mA $cm^{-2}$.

Electrochemical tests were carried out in half-coin cells (CR2032 size) for analysis. In half-coin tests, the active material is tested in an electrode versus a Li metal electrode to assess its fundamental performance. In the below examples, the active material composition to be tested was combined with N-Methyl Pyrrolidone (NMP), carbon black acting as a conductive additive, and poly(vinyldifluoride) (PVDF) binder and mixed to form a slurry using a lab-scale centrifugal planetary mixer. The non-NMP composition of the slurries was 90 wt % active material, 6 wt % conductive additive, 4 wt % binder. The slurry was coated on an Al foil current collector to the desired loading of 70 g $m^{-2}$ by doctor blade coating and dried. The electrodes were then calendared to a density of 2.6-3.2 g $cm^{-3}$ at 80° C. to achieve targeted porosities of 35-40%. Electrodes were punched out at the desired size and combined with a separator (Celgard porous PP/PE), Li metal, and electrolyte (1.3 M $LiPF_6$ in EC/DEC) inside a steel coin cell casing and sealed under pressure. Cycling was then carried out at 23° C. at low current rates (C/10) for 2 full cycles of lithiation and de-lithiation between 1.0-2.5 V for samples 1-9, and 1.0-3.0 V for samples 10-17. Afterwards, the cells were tested for their performance at increasing current densities. During rate tests, the cells were cycled asymmetric at 23° C., with a slow charge (lithiation, C/5) followed by increasing discharge rates (de-lithiation, e.g. 1 C, then 2 C, then 5 C, then 10 C) for dis-chargeability tests (e.g. measuring capacity retention). Nominal voltage vs Li/Li+ has been calculated from the integral of the V/Q curve divided by the total capacity at 5 C during de-lithiation. Samples 10-17 have been evaluated in at least triplicate, with errors presented as their standard deviation.

The electrical resistivity of the electrode coating was assessed by a 4-point-probe method with an Ossila instrument. An electrode coating was prepared to a mass loading of 70 g $cm^{-2}$ and calendared to a porosity of 35-40% on a sheet of insulating mylar for all samples. The sheet resistance was then measured on a 15 mm diameter disc in units of Ω per square at constant temperature of 23° C.

Homogeneous, smooth coatings on both Cu and Al current collector foils, the coatings being free of visible defects or aggregates were also prepared as above for selected samples with a centrifugal planetary mixer to a composition of up to 94 wt % active material, 4 wt % conductive additive, 2 wt % binder. These have been prepared with both PVDF and CMC:SBR-based binder systems. The coatings were calendared at 80° C. for PVDF and 50° C. for CMC:SBR to porosities of 35-40% at loadings from 1.0 to 3.5 mAh $cm^{-2}$. This is an important demonstration of these materials being viable in a commercially focussed electrodes for both high energy and high-power applications.

TABLE 4

A summary of electrical resistance measurements carried out as described. Resistivity was measured by 4-point-probe techniques, on equivalent coatings on mylar.

| Sample | Sheet resistance [Ω per square] |
|---|---|
| 1* | 763 ± 53 |
| 2 | 454 ± 25 |
| 3 | 745 ± 26 |
| 4 | 576 ± 27 |
| 5 | 668 ± 18 |
| 6 | 517 ± 15 |
| 7 | 559 ± 8 |
| 8 | 751 ± 31 |
| 9 | 644 ± 39 |

*Comparative sample

TABLE 5

A summary of electrochemical testing results from Li-ion half coin cells. In general (although not exclusively) it is beneficial to have a higher capacity, a higher ICE, and a lower nominal voltage.

| Sample | Delithiation specific capacity $2^{nd}$ C/10 cycle [mAh/g] | Coulombic efficiency $1^{st}$ cycle/$2^{nd}$ cycle at C/10 [%] | Nominal de-lithiation voltage at 5 C vs Li/Li$^+$ [V] |
|---|---|---|---|
| 1* | 212 | 97.41/98.40 | 1.76** |
| 2 | 234 | 98.13/98.82 | 1.72** |
| 3 | 224 | 96.75/98.93 | 1.72** |
| 4 | 206 | 91.06/97.82 | 1.75** |
| 5 | 218 | 95.58/98.88 | 1.73** |
| 6 | 217 | 93.84/98.92 | 1.77** |
| 7 | 221 | 95.97/99.09 | 1.72** |
| 8 | 208 | 94.69/98.81 | 1.71** |
| 9 | 227 | 97.77/99.21 | 1.75** |
| 10 | 205 ± 2 | 95.97 ± 0.21/97.92 ± 0.38 | 1.78 ± 0.01** |
| 11 | 217 ± 1 | 97.30 ± 0.16/98.80 ± 0.21 | 1.77 ± 0.01** |
| 12 | 213 ± 3 | 95.30 ± 0.71/96.85 ± 0.70 | 1.77 ± 0.03** |
| 13 | 208 ± 0 | 94.65 ± 0.18/97.70 ± 0.16 | 1.79 ± 0.01** |
| 14 | 212 ± 2 | 93.73 ± 0.29/97.21 ± 0.28 | 1.84 ± 0.01** |
| 15 | 211 ± 2 | 94.21 ± 0.56/96.82 ± 0.80 | 1.82 ± 0.00** |
| 16 | 215 ± 1 | 97.17 ± 0.80/98.75 ± 0.24 | 1.82 ± 0.00** |
| 17 | 215 ± 2 | 97.79 ± 0.18/98.91 ± 0.22 | 1.77 ± 0.01** |

*Comparative sample
**Samples 1-9 evaluated in the voltage range 1.0-2.5 V, samples 10-17 evaluated in the voltage range 1.0-3.0 V; this affects the absolute values for nominal voltage but not the trend.

TABLE 6

A summary of electrochemical testing results from Li-ion half coin cells. It is beneficial to have a higher capacity retention.

| Sample | 1 C/0.5 C delithiation capacity retention [%] | 2 C/0.5 C delithiation capacity retention [%] | 5 C/0.5 C delithiation capacity retention [%] | 10 C/0.5 C delithiation capacity retention [%] |
|---|---|---|---|---|
| 1* | 94.7 | 89.3 | 82.9 | 68.4 |
| 2 | — | — | 95.3 | 87.6 |
| 3 | 98.1 | 96.1 | 94.2 | 89.8 |
| 4 | 98.4 | 97.4 | 94.8 | 89.6 |
| 5 | — | — | 96.8 | 92.4 |
| 6 | — | — | 95.2 | 82.4 |
| 7 | — | — | 96.2 | 89.6 |
| 8 | 100 | 99.7 | 98.5 | 96.6 |
| 9 | 98.6 | 96.7 | 94.3 | 83.9 |
| 10 | 97.6 ± 0.8 | 95.2 ± 1.5 | 91.6 ± 2.4 | 84.9 ± 2.7 |
| 11 | 98.6 ± 0.5 | 97.2 ± 0.6 | 95.0 ± 0.7 | 90.0 ± 1.2 |
| 12 | 96.7 ± 0.5 | 93.6 ± 1.1 | 89.4 ± 2.0 | 83.5 ± 2.7 |
| 13 | 96.8 ± 0.1 | 93.7 ± 0.2 | 89.5 ± 0.4 | 84.1 ± 0.4 |
| 14 | 96.3 ± 0.2 | 92.5 ± 0.4 | 86.9 ± 0.7 | 79.6 ± 0.9 |
| 15 | 96.4 ± 0.1 | 93.0 ± 0.2 | 88.3 ± 0.3 | 80.9 ± 1.0 |
| 16 | 97.8 ± 0.1 | 95.4 ± 0.3 | 91.7 ± 0.4 | 86.5 ± 0.6 |
| 17 | 98.0 ± 1.0 | 96.3 ± 1.0 | 93.4 ± 1.3 | 89.4 ± 1.3 |

*Comparative sample

Example A

Samples 1* and 3

Comparative Sample 1* has been modified through cation substitution with the $P^{5+}$ cation, maintaining overall valency as in Sample 3 (i.e. isovalent M1 substitution where a>0). As valency is maintained, the effects on the $PNb_9O_{25}$ active material will be due to changing unit cell size and local distortions in crystal structure as a result of the different ionic radii of the cations used. For example, the ionic radius of the 4-coordinate $P^{5+}$ cation is 0.17 Å vs the ionic radius of 4-coordinate $Ti^{4+}$ cation of 0.42 Å.[7] This can give rise to improved electrochemical performance through altering the Li ion site availability by varying cavity size (in this case likely the Type VI cavity in particular),[4] and resultant electrochemical properties such as improved specific capacity, or improved Coulombic efficiency through reduction of energy barriers to reversible lithiation. This can also result in improved electrical conductivity through variations in crystal properties, and reduced impedance/polarisation electrochemically by improving Li-ion diffusion.

The exchange of the $P^{5+}$ cations for alternative electrochemically active cations such as $Ti^{4+}$ or $Mo^{6+}$ can also aid in the tuning of the redox properties of the material, such as by lowering the nominal voltage vs Li/Li$^+$ o increase full cell energy density, or by improving capacity and Coulombic efficiency through more efficient and reversible redox processes.

Table 2 demonstrates the change that has taken place in unit cell parameters between Sample 1* and 3. In particular there has been a change in the a and b parameters increasing by 0.0075 Å and the c parameter showing a slight reduction of 0.0030 Å. This demonstrates that isovalent substitution with materials of larger ionic radii can cause an expansion in the lattice in the a and b directions. This is carried across to minor improvements in electrical resistance shown in Table 4, reducing from Sample 1* to Sample 3 by 18 Ω per square. Electrochemical performance shows great improvements in Table 5 and Table 6, with improved specific capacity, improved $2^{nd}$ cycle Coloumbic efficiency, and reduction in polarisation at high voltage (represented by the nominal voltage at 5 C). Additionally, there are improvements in the specific capacity retention at increasing rates to 10 C, and likely beyond this to rates of 20 C or more, or 50 C or more, or 100 C or more.

It is expected that similar benefits will be observed with the described M1 dopants for use in Li-ion cells.

Example B

Samples 1*, 4, and 5

Comparative Sample 1* has been modified through cation substitution with the $Nb^{5+}$ cation, maintaining overall valency as in Samples 4 and 5 (i.e. isovalent M2 substitution where b>0). Similar advantages can be observed as in Example A, as a result of altered unit cell size, electrical, and electrochemical properties. Specifically, Samples 4 and 5 show improved electrical resistance in Table 4 versus Sample 1*, and improvements in the specific capacity retention at increasing rates to 10 C in Table 6, and likely beyond this to rates of 20 C or more, or 50 C or more, or 100 C or more.

It is expected that similar benefits will be observed with the described M2 dopants for use in Li-ion cells.

Example C

Samples 1*, 6, 9, and 11-17

Comparative Sample 1* has been modified through cation substitution without maintaining overall valency in Samples 6, 9,and 11-17. For example, in Samples 6 and 9 a cation of lower valency has been utilised, with others in the case of Sample 6. The advantages from altering ionic radii by substitution as described in Examples A and B are maintained. For Samples 6 and 9, the lower valency results in crystal structure changes, and electronic structure changes. If the substitution takes place in the same cation site, e.g. $P^{5+}$ directly substitutes for $Al^{3+}$, then the O-content of the material will be decreased proportionally to maintain a charge-balanced structure (i.e. oxygen deficient vs the base $PNb_9O_{25}$ structure). This creates defects and additional charge carriers in the structure (i.e. electron holes), improving electrical conductivity. This can also induce crystal distortions due to altered coordination with O anions and surrounding P/Nb cations, further improving electrical and electrochemical performance in a similar fashion to altering ionic radii as described.

This is observed in Table 2, where the unit cell parameters demonstrate a decrease in a and b parameters, and a decrease in the c parameter as well, overall demonstrating a minor crystal structure contraction. Electrical resistance measurements show improvements in Table 4, with large reductions in the observed sheet resistance vs Sample 1. Electrochemical measurements additionally show advantages for both Samples 6 and 9 in specific capacity, $2^{nd}$ cycle Coulombic efficiency, polarisation, and capacity retention at high rates in Table 5 and Table 6.

Samples 11-17 demonstrate further substitutions of $P^{5+}$ by M1 or $Nb^{5+}$ by M2 without maintaining overall valency. Each of Samples 11-17 provided significantly improved capacity retention at high rates compared to Comparative Sample 1* (Table 6).

It is expected that similar benefits will be observed with cation or anion exchange of lower or increased valency vs $P^{5+}$ or $Nb^{5+}$ for use in Li-ion cells.

Example D

Samples 1*, 2, 6, and 7

Comparative Sample 1* and Sample 6 have been modified through the introduction of induced oxygen vacancy defects (cf. oxygen deficiency) by a heat treatment in an inert or reducing atmosphere to provide Samples 2 and 7. By treating these materials at high temperature in an inert or reducing atmosphere, they may be partially reduced and maintain this upon return to room temperature and exposure to air atmosphere. This is accompanied with an obvious colour change, for example Sample 2 is light blue in colour vs white for Sample 1*. This colour change demonstrates a significant change in the electronic structure of the material, allowing it to interact with different energies (i.e. wavelength) of visible light due to reduced band gap.

The induced oxygen vacancy is specifically a defect in the crystal structure where an oxygen anion has been removed. This provides excess electrons improving material electrical conductivity significantly, and alters the band gap energy as demonstrated by colour changes. If induced oxygen vacancies are present beyond 5 at% (i.e. c>1.25), then the crystal structure collapses due to a loss in stability. These induced oxygen vacancies can be present in addition to oxygen deficiency caused by the use of subvalent cation exchange, as shown in Sample 7. Evidence of oxygen deficiency is provided here by TGA analysis in air, showing a mass increase upon increasing temperature; this has been assumed to correspond to the degree of oxygen deficiency present as it becomes oxidised to provide once more analogous structures to Sample 1* and 6. A host of other techniques can also be employed as described above to quantify oxygen deficiency.

Table 2 demonstrates the change in unit cell parameters that take place upon inducing oxygen vacancies in Samples 2 and 7. Electrical resistance measurements show improvements in Table 4 for Sample 2 over Sample 1*. A similar sheet resistance was observed between Sample 6 and 7, due to Sample 6 already being oxygen deficient due to its subvalent substitution of $P^{5+}$ with $Al^{3+}$. Electrochemical measurements additionally show significant advantages for Sample 7 vs 6 in specific capacity, $1^{st}$ and $2^{nd}$ cycle Coulombic efficiencies, polarisation, and capacity retention at high rates in Table 5 and Table 6.

It is expected that similar benefits will be observed with any of the described PNO structures having induced oxygen deficiency for use in Li-ion cells.

Example E

Samples 1*, 5, 8, and 10

Sample 5 has been modified through the introduction of $N^{3-}$ anions (cf. nitridation) to provide Sample 8. This was carried out by a solid-state synthesis route but could equally be carried out with a gaseous route utilising $NH_3$ gas at high temperature, or through use of a dissolved N-containing material in a solvent that is subsequently evaporated followed by high temperature heat treatment. Sample 8 is brown compared to Sample 5, which is off-white/light yellow, demonstrating changes to the active material electronic structure in a similar fashion to Example D.

In a similar fashion to Examples A-C, this exchange may take place in an $O^{2-}$ anion site, in which case the increased valency may increase the electronic conductivity of the material. It may also take place in an interstitial site within the crystal structure. In both cases, this may also give rise to different unit cell size and associated crystallographic distortions due to the differing ionic radii and valency of the anions, providing similar potential benefits to Examples A-D.

Table 2 demonstrates the change in unit cell parameters that take place upon introduction of $N^{3-}$ anions for Sample 8 over Sample 5, with large reductions in the a and b parameters, and a small increase in the c parameter, providing evidence for $N^{3-}$ incorporation within the crystal structure. Electrochemical measurements show improvements in capacity retention at high rates for Sample 8 vs 5 (Table 6).

Compared to the reference Sample 1*, Sample 8 has significantly improved capacity retention at high rates.

Comparative Sample 1* has been modified to introduce F⁻ anions to provide Sample 10. Electrochemical measurements show significant improvements in capacity retention at high rates for Sample 10 vs 1* (Table 6).

It is expected that similar benefits will be observed through the use of anions of different electronegativity and valency with any of the described PNO structures for use in Li ion cells.

Discussion

Comparative Sample 1* may also be modified with more than one type of cation/anion substitution, or induced oxygen deficiency (i.e. $a>0$ and $b>0$; or $a>0$, $d>0$; or $a>0$, $b>0$, $c>0$, and so on). Sample 6 demonstrates the effect of having $a>0$ and $b>0$; Sample 7 demonstrates the effect of having $a>0$, $b>0$ and $c>0$. A material with additionally $d>0$ is expected to provide additional benefits in performance to the active material. Improvements as described for Examples A-E are expected for these materials that demonstrate multiple types of modifications.

Table 2 demonstrates changes in unit cell parameters reflecting the alterations to the materials that have taken place. Samples 6 and 7 both show large improvements in the electrical resistance vs Sample 1* as shown in Table 4. Electrochemical measurements additionally show significant advantages for both Samples 6 and 7 vs 1* in specific capacity, $2^{nd}$ cycle Coulombic efficiencies, polarisation (for Sample 7), and capacity retention at high rates in Table 5 and Table 6.

Figure 6:
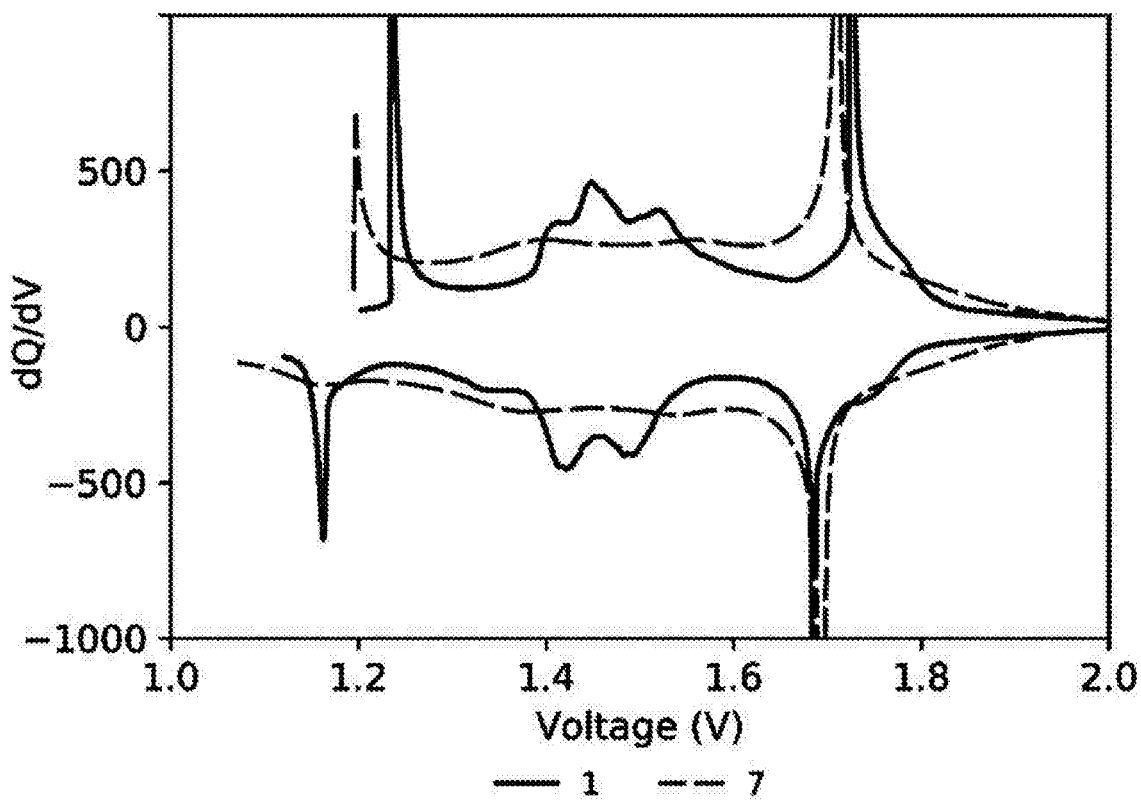
FIG. 6: A plot of the derivative of capacity versus voltage (dQ/dV) for Sample 1 and 7 at a rate of C/10 for their second lithiation and de-lithiation cycles, between 1.0-3.0 V.

By introducing increased degrees of disorder in the crystal structure (cf. entropy) this can aid in reversible lithiation processes by providing less significant energy barriers to reversible lithiation, and to prevent Li ion ordering within a partially lithiated crystal. This can also be defined as creating a spread in the energetic states for Li ion intercalation, which prevents unfavourable lithium ordering and entropic energy barriers. For example, this can be inferred from examining the dQ/dV plot shown in FIG. 6, with less significant peaks present for Sample 1* vs Sample 7.

It is expected that similar benefits will be observed in any of the described PNO structures utilising any combination of M1, M2, Q, a, b, c, and d within the described limits for use in Li ion cells.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention. For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

REFERENCES

A number of publications are cited above in order to more fully describe and disclose the invention and the state of the art to which the invention pertains. Full citations for these references are provided below. The entirety of each of these references is incorporated herein.

1. J. B. Goodenough et.al., *J. Am. Chem. Soc.*, 135, (2013), 1167-1176.
2. R. S. Roth et al, *Acta Cryst*, 18, 1965, 643-647.
3. J. Xu et al, *Inorg. Chem.*, 33, 1994, 267-270.
4. S. Patoux et al, *J. Electrochem. Soc.*, 149, 2002, A391-A400.
5. H. Yu et al, *Mater. Chem. Front.*, 4, 2020, 631-637.
6. M. B. Preefer et al, *Chem. Mater.*, 32, 2020, 4553-4563.
7. R. D. Shannon, *Acta Cryst.*, A32, 1976, 751-767.
8. A. Benabbas, *Acta Cryst Cryst. Struct. Comm.*, 47, 1991, 849-850.

The invention claimed is:

1. An electrode comprising a phosphorus niobium oxide active electrode material in electrical contact with a current collector, wherein the active electrode material has the composition
M1$_a$P$_{x-a}$M2$_b$Nb$_{9-b}$O$_{25-c-d}$Q$_d$, wherein: 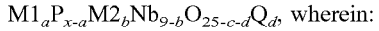
M1 is selected from Na, K, Mg, Ca, Sr, Y, Ti, Zr, Hf, Nb, Ta, Cr, Mo, W, Mn, Fe, Co, Ni, Cu, Zn, B, Al, Ga, Si, Ge, Sn, Bi, Sb, and mixtures thereof;
M2 is selected from Na, K, Mg, Ca, Sr, Y, Ti, Zr, Hf, V, Ta, Cr, Mo, W, Mn, Fe, Co, Ni, Cu, Zn, B, Al, Ga, Si, Ge, Sn, Bi, P, Sb, and mixtures thereof;
Q is selected from F, Cl, Br, I, N, S, Se, and mixtures thereof;
$0 \leq a \leq 0.5$; $0 \leq b \leq 2$; $-0.5 \leq c \leq 1.25$; $0 \leq d \leq 5$; $1 \leq x \leq 2$; and
one or more of a, b, c, and d does not equal 0;
with the proviso that if M1 consists of Nb and if M2 consists of P then c is $>0$.

2. The electrode of claim 1, wherein
 (i) $a>0$; and/or
 (ii) $0 \leq a \leq 0.3$.

3. The electrode of claim 1, wherein
 (i) $b>0$; and/or
 (ii) $0 \leq b \leq 1.5$.

4. The electrode of claim 1, wherein
 (i) $c \neq 0$; or
 (ii) $0 \leq c \leq 1.25$.

5. The electrode of claim 1, wherein
 (i) $d>0$; and/or
 (ii) $0 \leq d \leq 2.5$.

6. The electrode of claim 1, wherein $1 \leq x \leq 1.25$.

7. The electrode of claim 1, wherein at least one of a and b is $>0$.

8. The electrode of claim 1, wherein M1 is selected from Ti, Zr, Hf, Nb, Ta, Cr, Mo, W, Mn, Fe, Co, Ni, Cu, Zn, B, Al, Ga, Si, Ge, Sn, Bi, Sb, and mixtures thereof.

9. The electrode of claim 1, wherein M2 is selected from Ti, Zr, Hf, V, Ta, Cr, Mo, W, Mn, Fe, Co, Ni, Cu, Zn, B, Al, Ga, Si, Ge, Sn, Bi, P, Sb, and mixtures thereof.

10. The electrode of claim 1, wherein M1 does not comprise Nb and wherein M2 does not comprise P.

11. The electrode of claim 1, wherein Q is selected from F, Cl, N, S, and mixtures thereof.

12. The electrode according to claim 1, wherein the active electrode material is oxygen deficient.

13. The electrode according to claim 1, wherein the active electrode material is coated with carbon.

14. The electrode according to claim 13, wherein the carbon coating comprises polyaromatic sp$^2$ carbon.

15. The electrode according to claim 1, wherein the active electrode material is in particulate form, wherein the active electrode material has a D$_{50}$ particle diameter in the range of 0.1-100 μm.

16. The electrode according to claim 1, wherein the active electrode material has a BET surface area in the range of 0.1-100 m$^2$/g.

17. The electrode according to claim 1, wherein the active electrode material further comprises Li and/or Na.

18. The electrode according to claim 1, wherein the crystal structure of the active electrode material as determined by X-ray diffraction corresponds to the crystal structure of one or more of $PNb_9O_{25}$, and $P_{2.5}Nb_{18}O_{50}$.

19. An electrochemical device comprising an anode, a cathode, and an electrolyte disposed between the anode and the cathode, wherein the anode comprises an active electrode material as defined in claim 1;
   wherein the electrochemical device is a lithium-ion battery or a sodium-ion battery.

20. The electrode according to claim 14, wherein the carbon coating is derived from pitch carbons.

\* \* \* \* \*